US012585878B2

(12) United States Patent
Hoshi et al.

(10) Patent No.: US 12,585,878 B2
(45) Date of Patent: Mar. 24, 2026

(54) INFORMATION PROCESSING APPARATUS AND INFORMATION PROCESSING METHOD

(71) Applicant: Kioxia Corporation, Tokyo (JP)

(72) Inventors: Yasuto Hoshi, Tokyo (JP); Daisuke Miyashita, Kawasaki (JP); Jun Deguchi, Kawasaki (JP)

(73) Assignee: Kioxia Corporation, Tokyo (JP)

( * ) Notice: Subject to any disclaimer, the term of this patent is extended or adjusted under 35 U.S.C. 154(b) by 377 days.

(21) Appl. No.: 18/181,642

(22) Filed: Mar. 10, 2023

(65) Prior Publication Data

US 2023/0367965 A1     Nov. 16, 2023

(30) Foreign Application Priority Data

May 13, 2022     (JP) ................................. 2022-079628

(51) Int. Cl.
G06F 40/295 (2020.01)
G06N 3/045 (2023.01)

(52) U.S. Cl.
CPC ........... G06F 40/295 (2020.01); G06N 3/045 (2023.01)

(58) Field of Classification Search
CPC .. G06F 16/313; G06F 16/3347; G06F 40/295; G06F 16/285; G06F 16/288; G06F 16/13; G06F 16/284; G06F 16/3332; G06F 18/10; G06F 18/22; G06F 16/22; G06F 16/2272; G06F 16/2255; G06F 16/245;
(Continued)

(56) References Cited

U.S. PATENT DOCUMENTS 11,321,529 B2 * 5/2022 Wang .................... G06F 40/205
11,947,571 B2 * 4/2024 Hedayati ............... G06F 16/353
(Continued)

FOREIGN PATENT DOCUMENTS

CN        109325108 A      2/2019
CN        111767365 A      10/2020
(Continued)

OTHER PUBLICATIONS

Cao et al., "Exploring Combinations of Ontological Features and Keywords for Text Retrieval", PRICAI 2008, 2008, pp. 603-613.
(Continued)

*Primary Examiner* — Abdelali Serrou
(74) *Attorney, Agent, or Firm* — Oblon, McClelland, Maier & Neustadt, L.L.P.

(57) ABSTRACT

According to one embodiment, an apparatus includes: an interface circuit configured to receive first data items respectively relating to documents and a second data item relating to a question; and a processor configured to process the first and second data items, wherein the processor is configured to: extract first named entities respectively from the first data items and extract a second named entity from the second data item; generate first vectors respectively relating to the first data items and the corresponding first named entities; generate a second vector relating to the second data item and the second named entity; calculate a similarity between each of the first vectors and the second vector; and acquire a third data item relating to an answer retrieved from the first data items based on a result of calculating the similarity.

14 Claims, 15 Drawing Sheets

(58) Field of Classification Search

CPC ............. G06F 16/3322; G06F 16/3344; G06F 16/367; G06F 16/88; G06F 16/93; G06F 16/958; G06F 18/214; G06F 40/143; G06F 40/151; G06F 40/157; G06F 40/166; G06F 40/232; G06F 40/247; G06F 40/42; G06F 8/43; G06F 8/73

See application file for complete search history.

(56) References Cited

U.S. PATENT DOCUMENTS

| | | | |
|---|---|---|---|
| 12,190,621 B2 * | 1/2025 | Basu | G06F 18/24323 |
| 2007/0233656 A1 * | 10/2007 | Bunescu | G06F 40/295 |
| 2012/0185480 A1 * | 7/2012 | Ni | G06F 16/355 |
| | | | 707/E17.089 |
| 2017/0124447 A1 * | 5/2017 | Chang | G06F 40/30 |
| 2021/0191990 A1 | 6/2021 | Shi et al. | |
| 2021/0374347 A1 * | 12/2021 | Yang | G06F 40/295 |
| 2023/0282018 A1 * | 9/2023 | Basu | G06F 40/295 |
| | | | 382/181 |

FOREIGN PATENT DOCUMENTS

| | | |
|---|---|---|
| JP | 2019-164409 A | 9/2019 |
| JP | 2020-140435 A | 9/2020 |
| JP | 2021-99803 A | 7/2021 |

OTHER PUBLICATIONS

Karpukhin, V., et al. "Dense Passage Retrieval for Open-Domain Question Answering" In Proceedings of the 2020 Conference on Empirical Methods in Natural Language Processing (EMNLP), pp. 6769-6781, Online, Association for Computational Linguistics, 2020.

Sciavolino, C., et al. "Simple Entity-Centric Questions Challenge Dense Retrievers" In Proceedings of the 2021 Conference on Empirical Methods in Natural Language Processing, pp. 6138-6148, Online and Punta Cana, Dominican Republic, Association for Computational Linguistics, 2021.

* cited by examiner

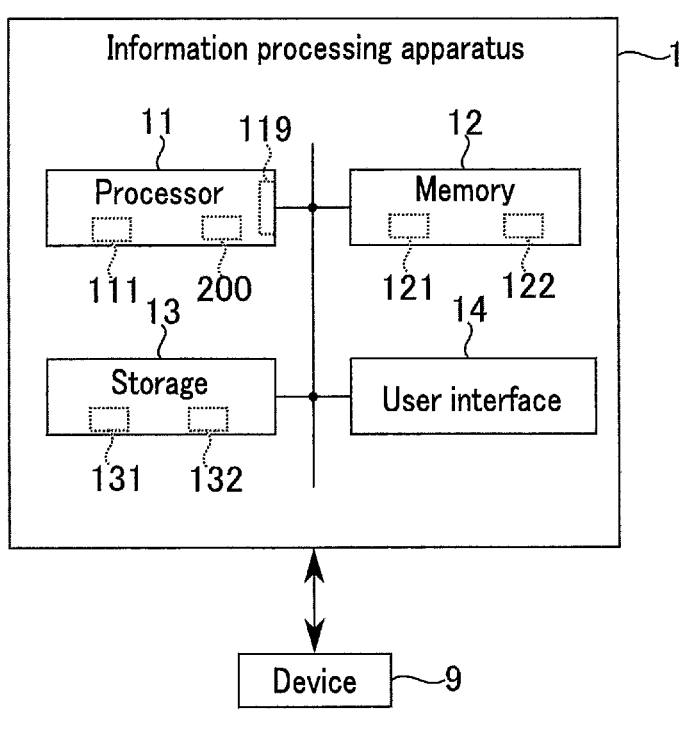
F I G. 1

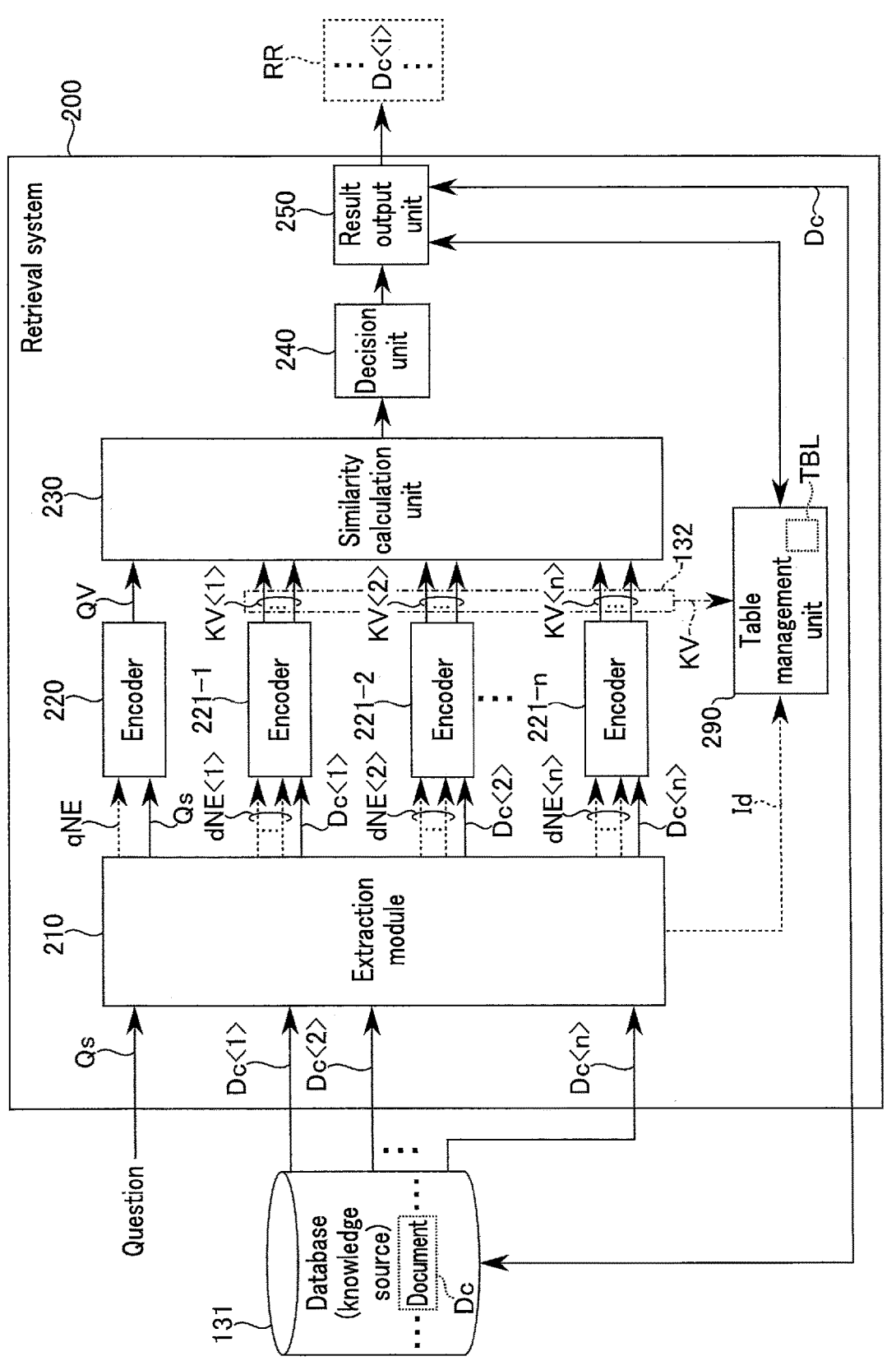
F I G. 2

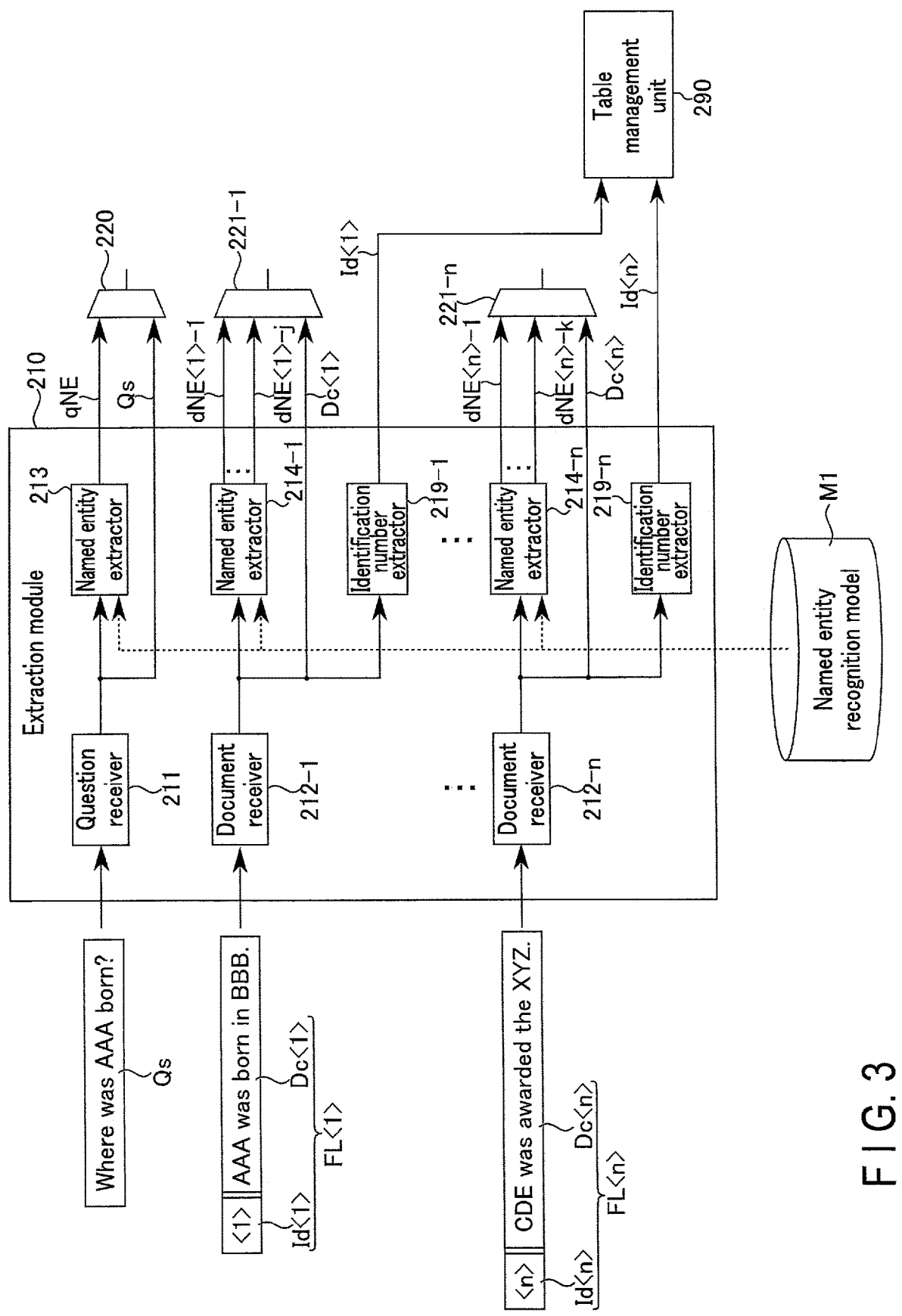
F I G. 3

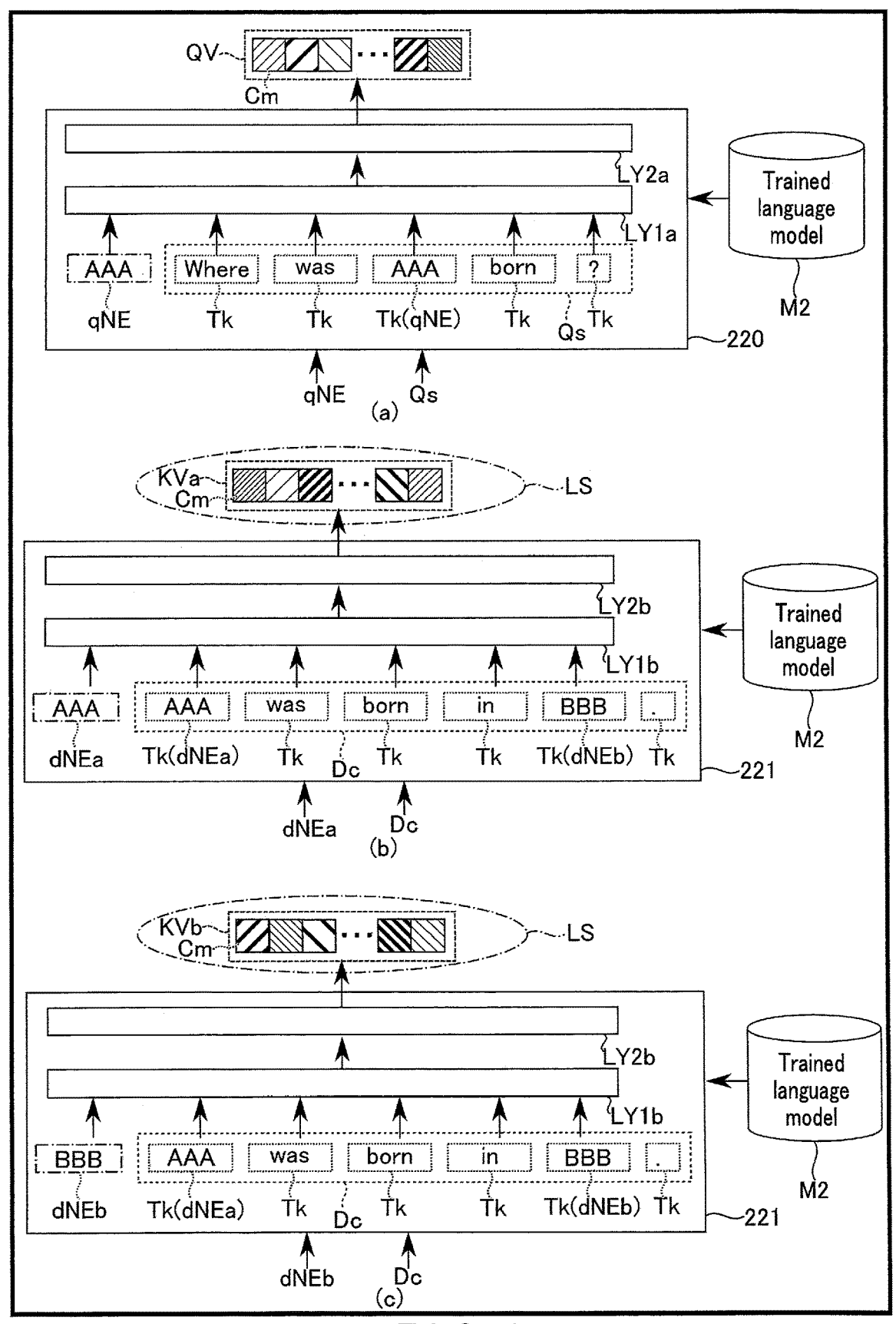
F I G. 4

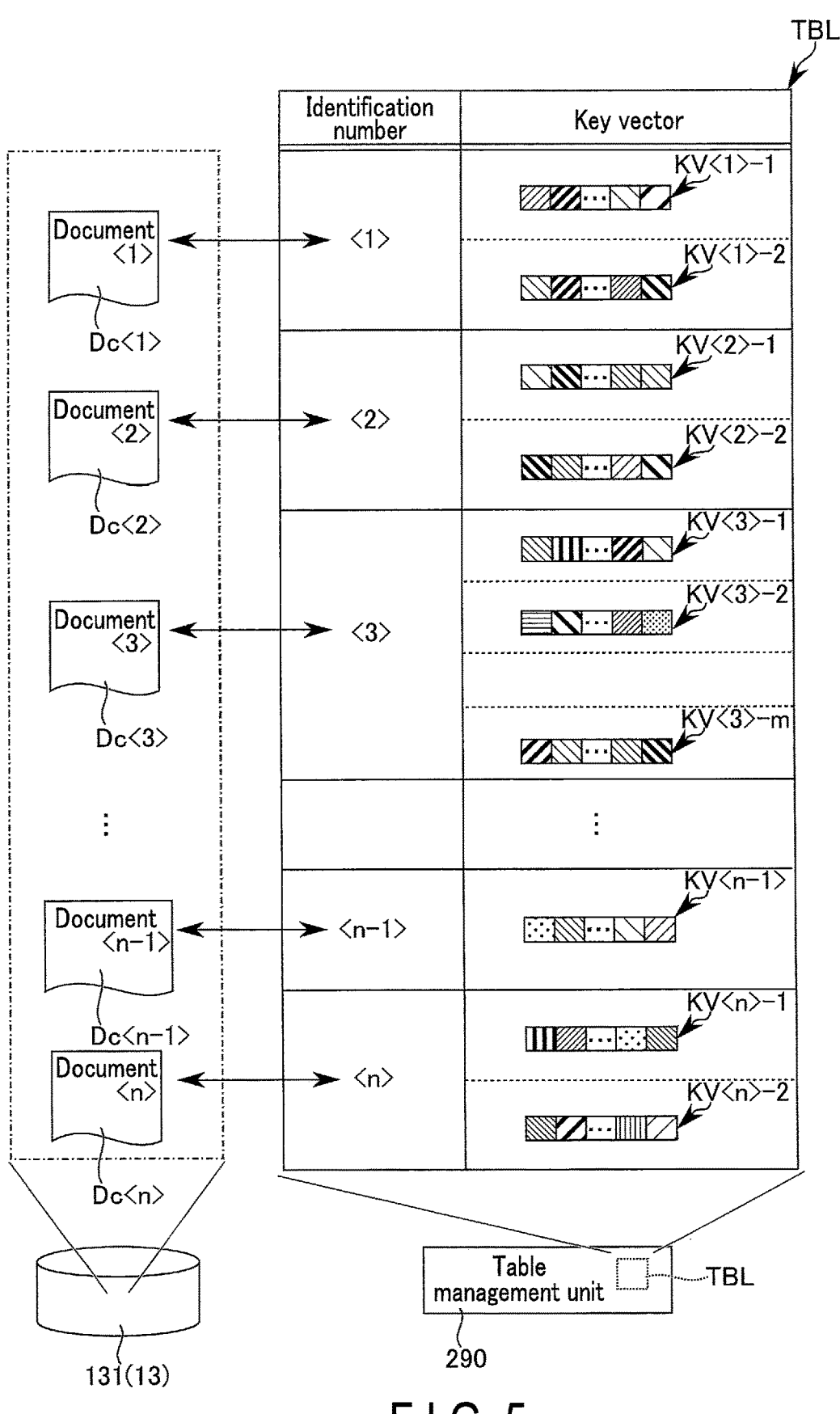
F I G. 5

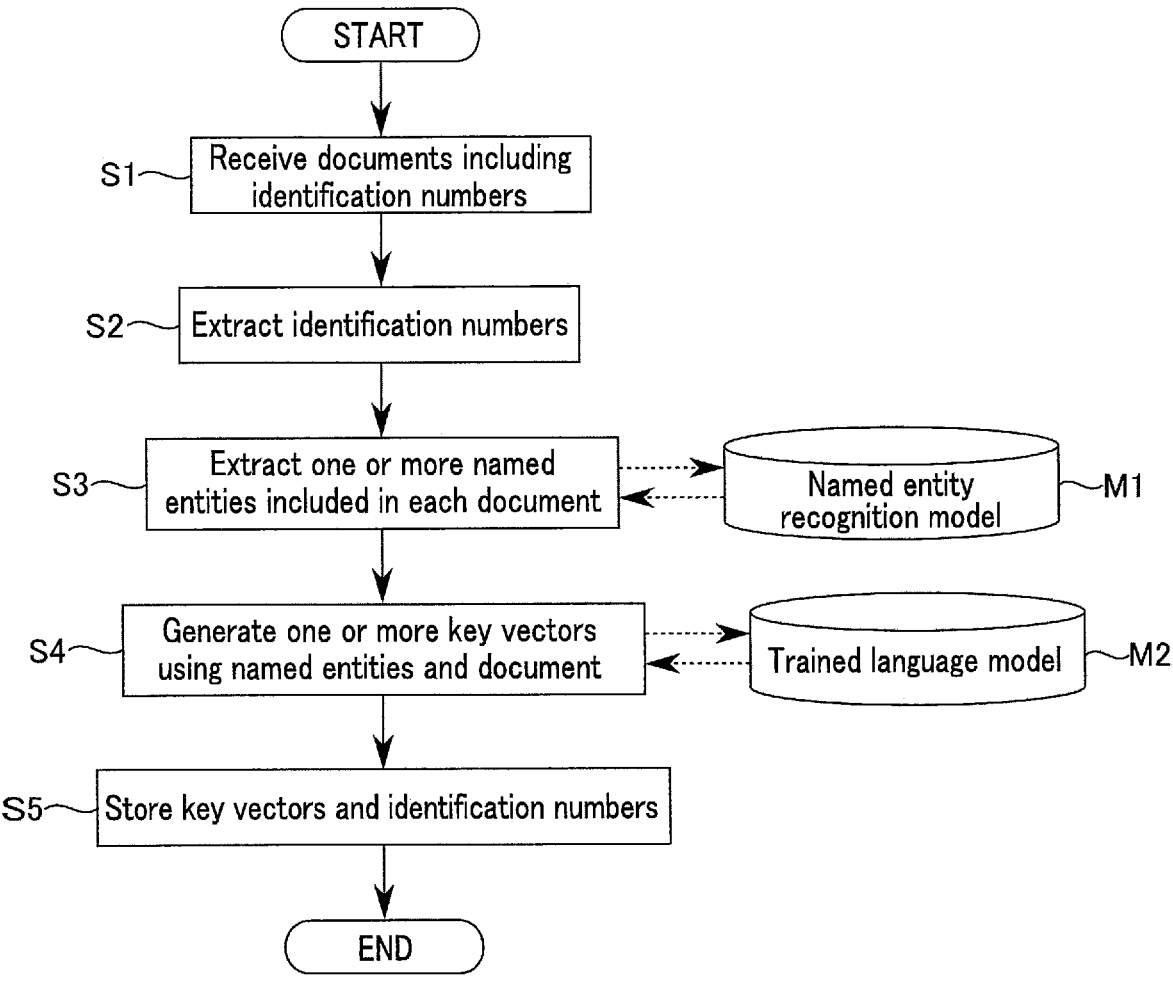
F I G. 6

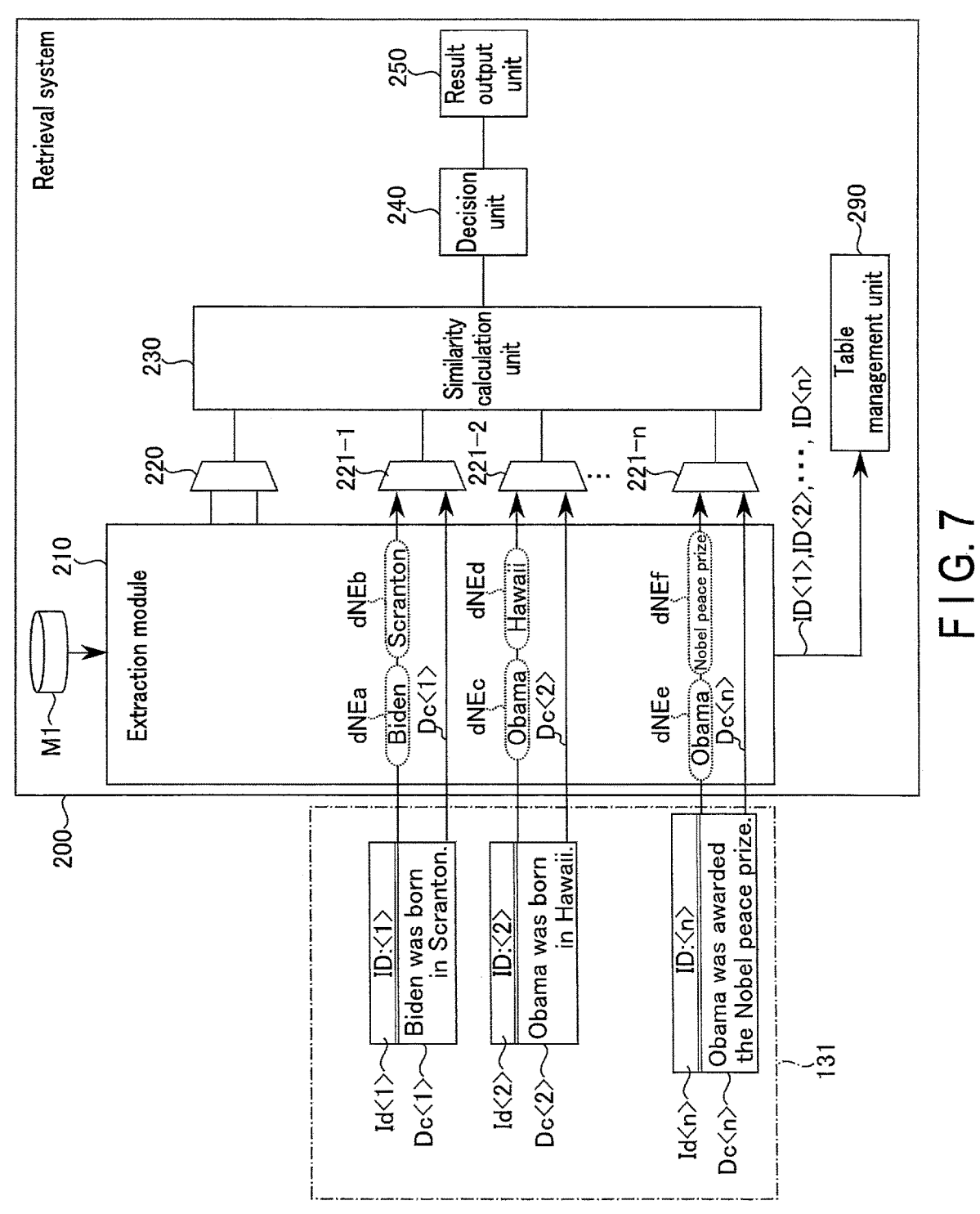
F I G. 7

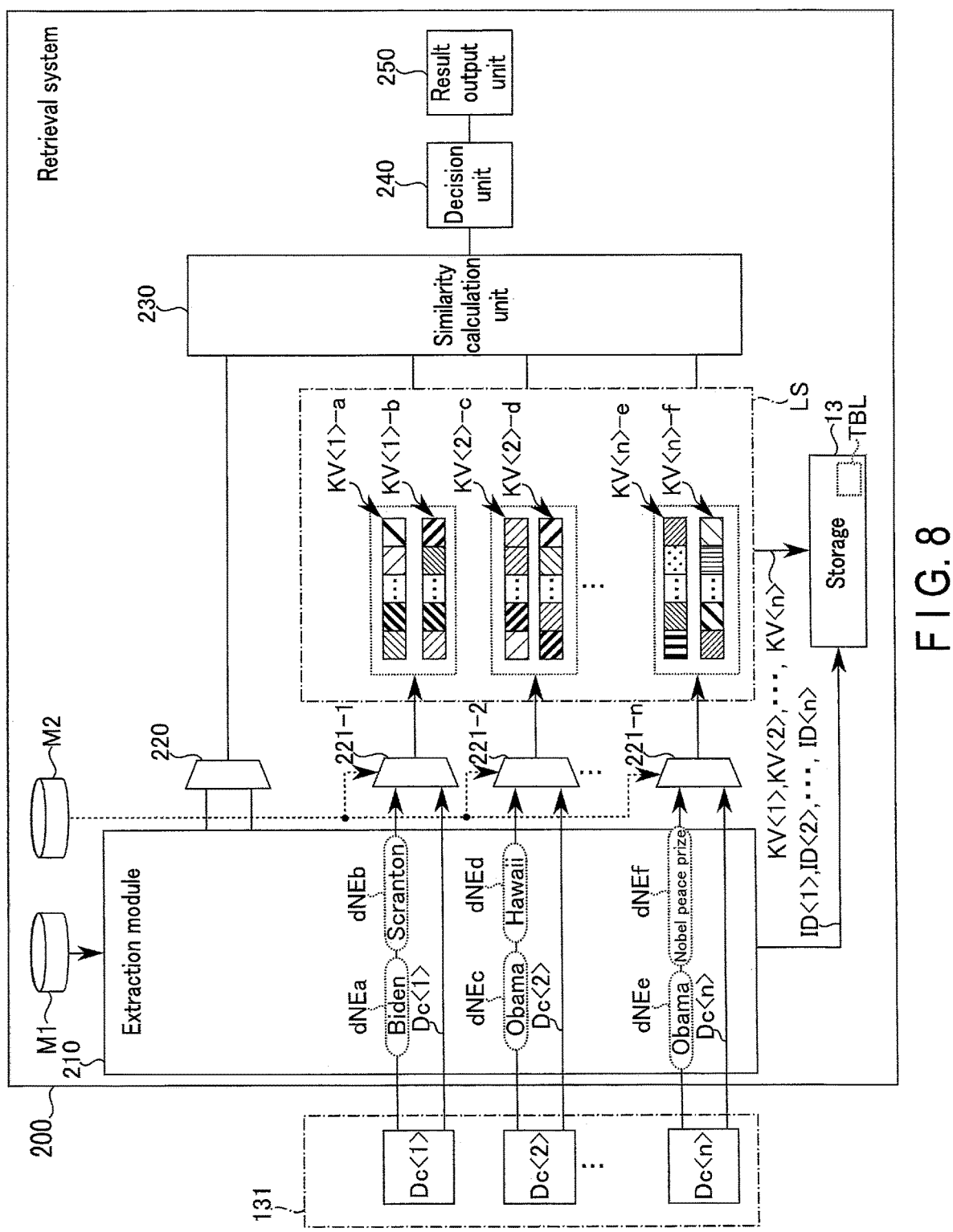
F I G. 8

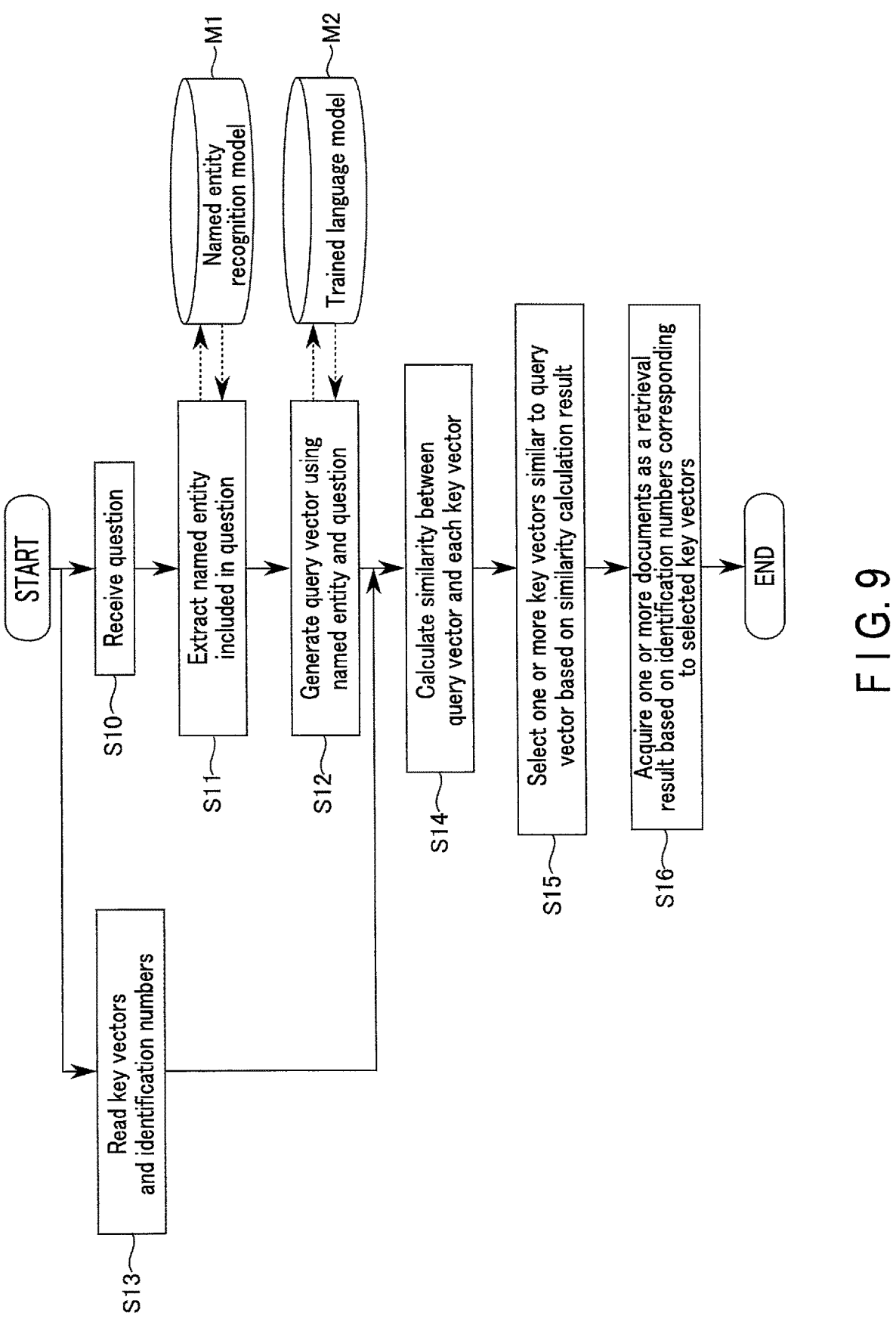
F I G. 9

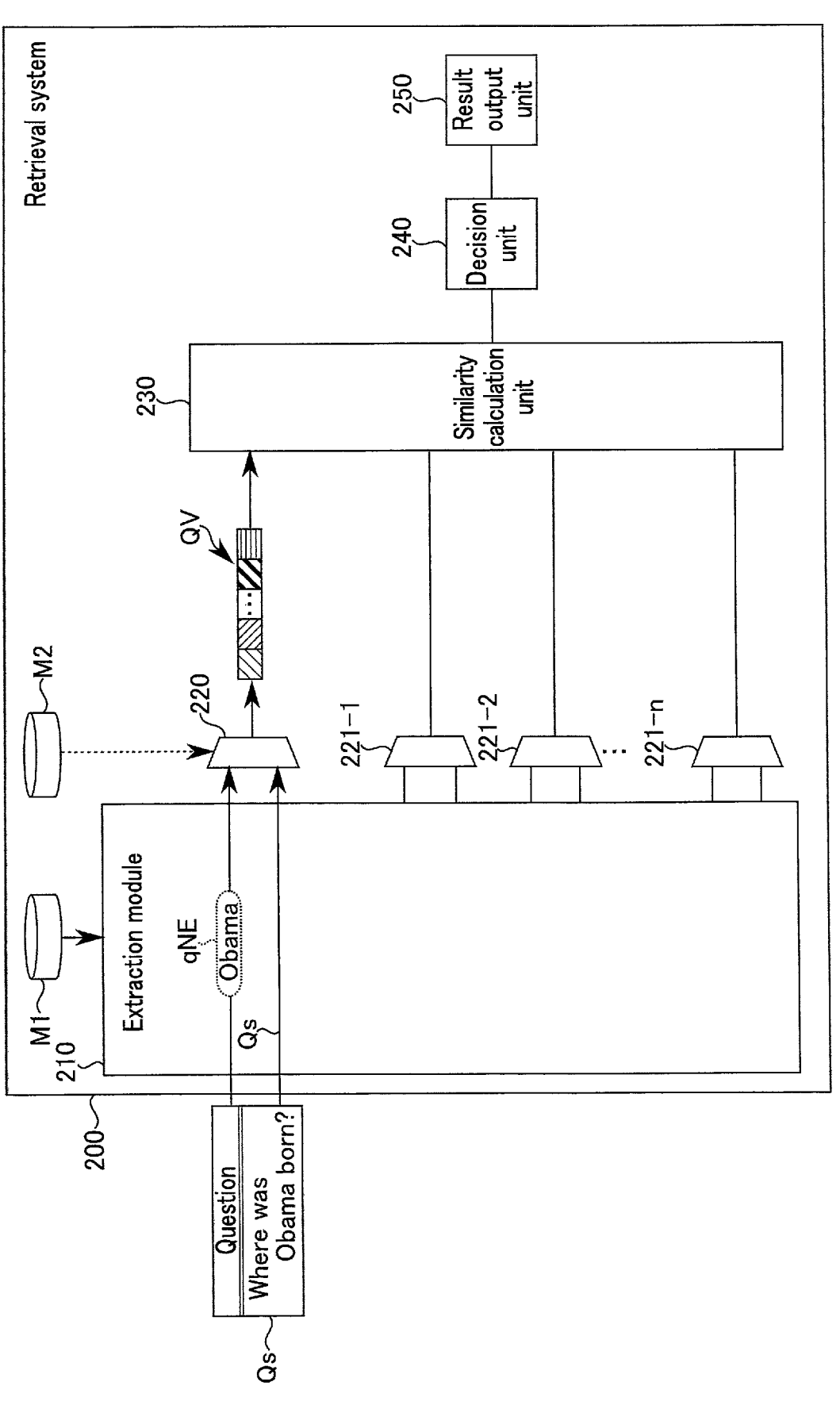
F I G. 10

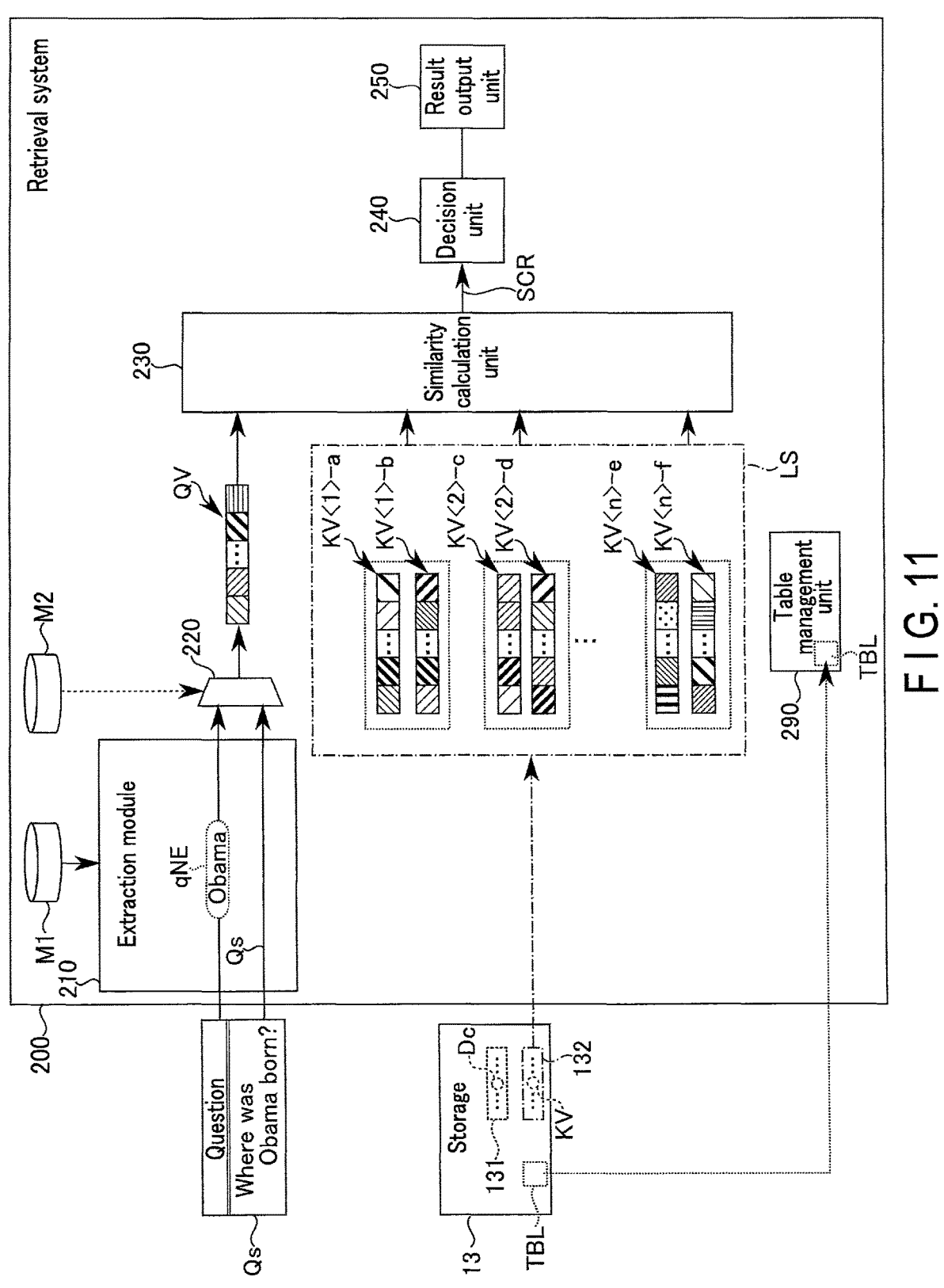
F I G. 11

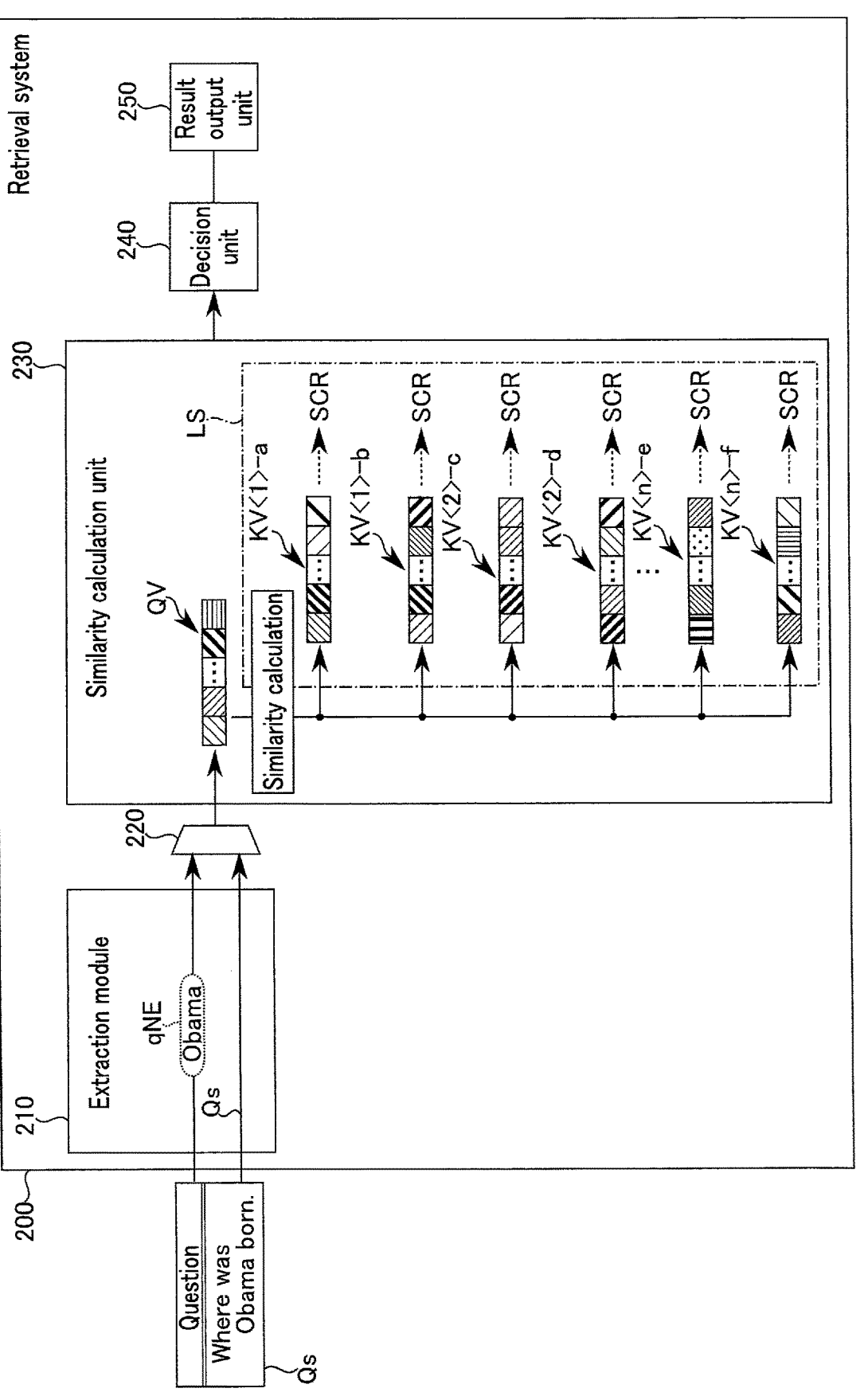
F I G. 12

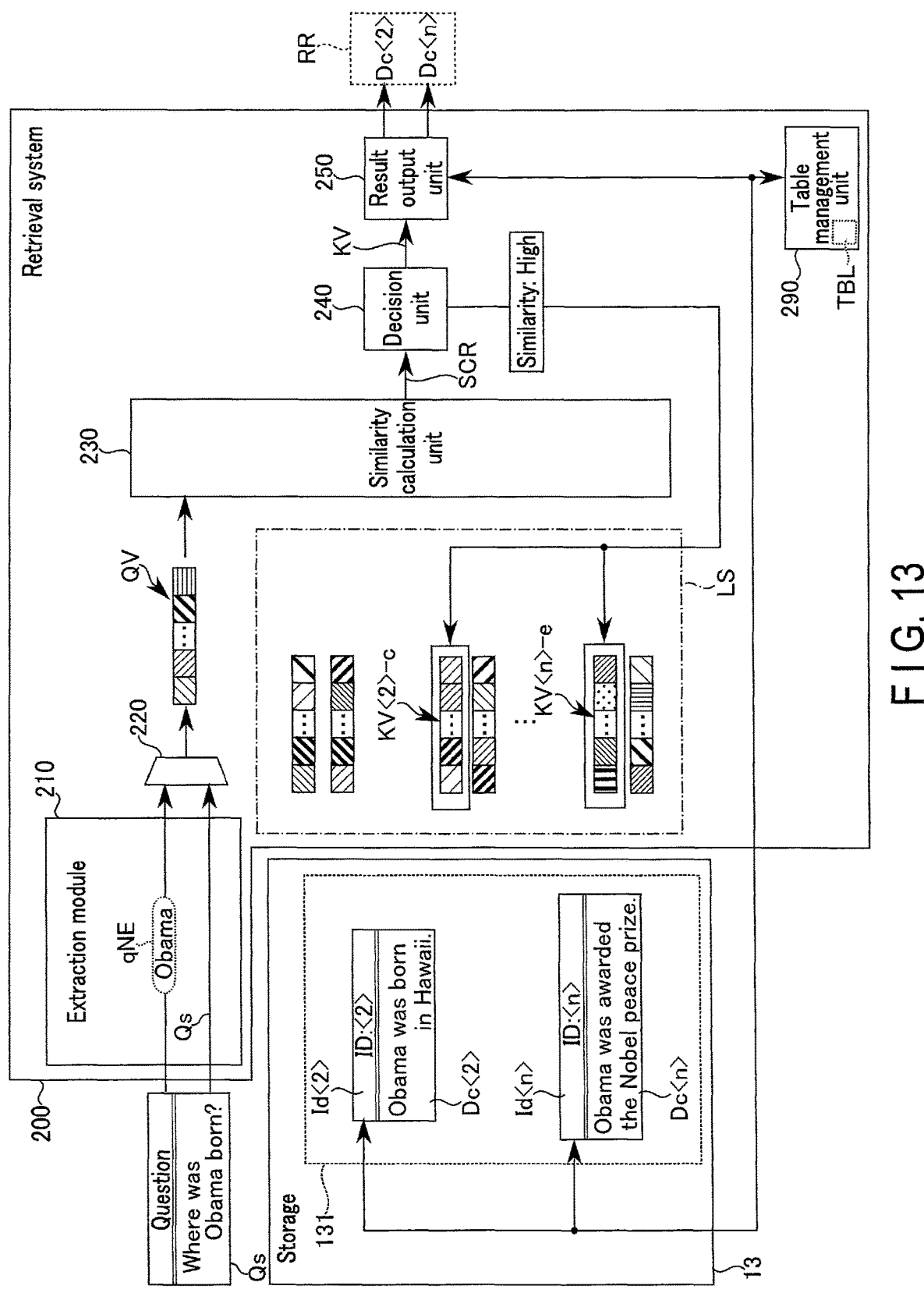
F I G. 13

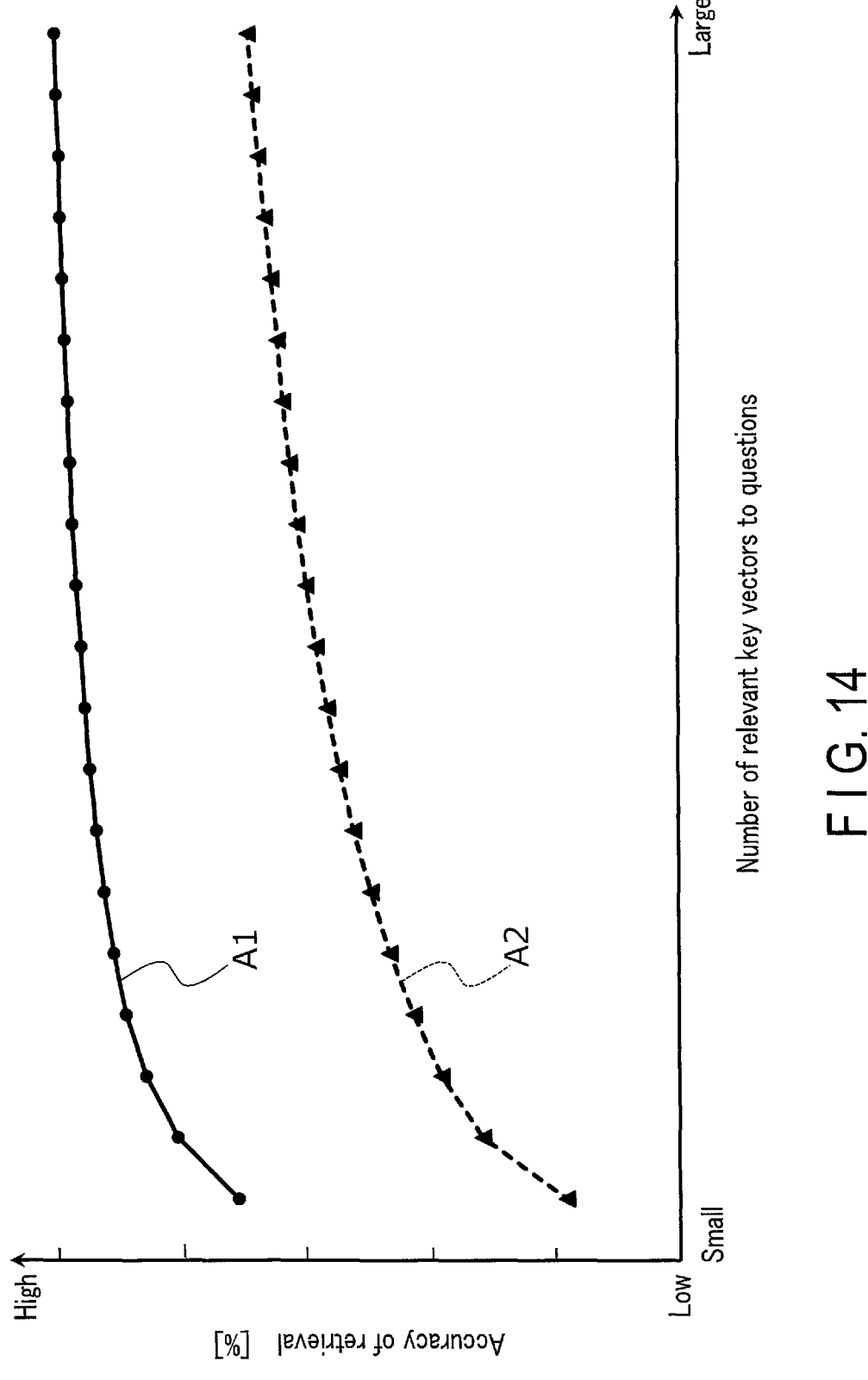
F I G. 14

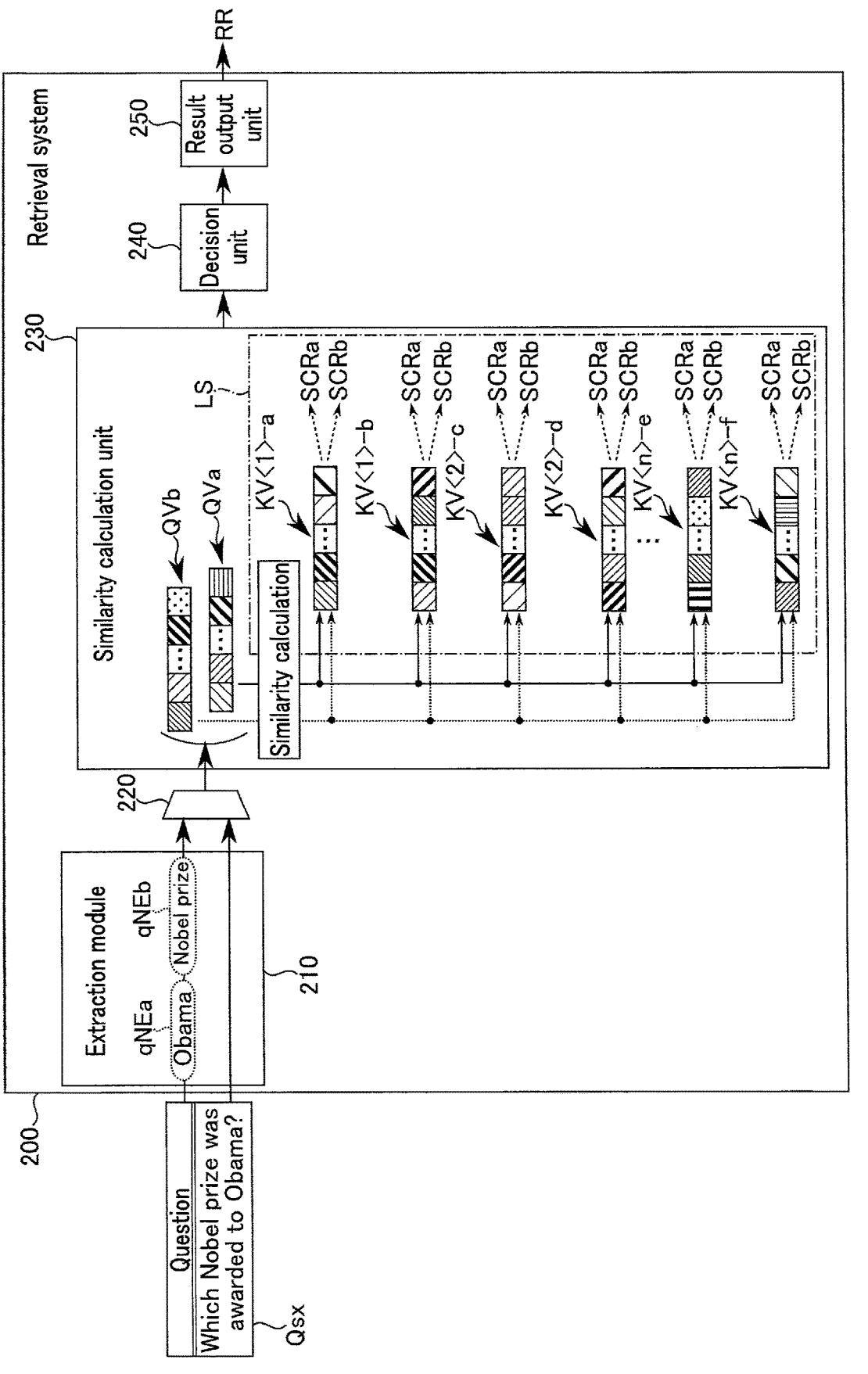
F I G. 15

INFORMATION PROCESSING APPARATUS AND INFORMATION PROCESSING METHOD

CROSS-REFERENCE TO RELATED APPLICATIONS

This application is based upon and claims the benefit of priority from Japanese Patent Application No. 2022-079628, filed May 13, 2022, the entire contents of which are incorporated herein by reference.

FIELD

Embodiments described herein relate generally to an information processing apparatus and an information processing method.

BACKGROUND

A method, a device, and a system relating to machine learning has been studied and proposed. For example, to improve the accuracy of various tasks of machine learning, a variety of calculation techniques, processing techniques, system configurations, and device configurations have been studied and proposed. Retrieval of information using machine learning includes a task of retrieving information related to a question taken as input data from a database. In such a task, there is a case where the accuracy of retrieval of information related to an answer to an unseen question is low. Therefore, improvement in the accuracy of retrieval of information using machine learning has been demanded.

BRIEF DESCRIPTION OF THE DRAWINGS

FIG. 1 is a block diagram showing a configuration example of an information processing apparatus according to an embodiment.

FIG. 2 is a block diagram showing a configuration example of a retrieval system in the information processing apparatus according to the embodiment.

FIG. 3 is a block diagram showing a configuration example of a part of the retrieval system in the information processing apparatus according to the embodiment.

FIG. 4 is a block diagram showing a configuration example of another part of the retrieval system in the information processing apparatus according to the embodiment.

FIG. 5 is a schematic diagram for illustrating a configuration example of another part of the retrieval system in the information processing apparatus according to the embodiment.

FIG. 6 is a flowchart showing an information processing method according to the embodiment.

FIG. 7 is a schematic diagram for illustrating a part of the information processing method according to the embodiment.

FIG. 8 is a schematic diagram for illustrating another part of the information processing method according to the embodiment.

FIG. 9 is a flowchart showing an information processing method according to the embodiment.

FIG. 10 is a schematic diagram for illustrating a part of the information processing method according to the embodiment.

FIG. 11 is a schematic diagram for illustrating another part of the information processing method according to the embodiment.

FIG. 12 is a schematic diagram for illustrating yet another part of the information processing method according to the embodiment.

FIG. 13 is a schematic diagram for illustrating yet another part of the information processing method according to the embodiment.

FIG. 14 is a graph indicating characteristics of the information processing apparatus according to the embodiment.

FIG. 15 is a schematic diagram for illustrating a modification of the information processing apparatus according to the embodiment.

DETAILED DESCRIPTION

Hereinafter, an embodiment will be described in detail with reference to FIGS. 1 to 15. In the description that follows, elements having an identical function and configuration will be assigned identical numerals. Also, in each embodiment to be described below, if structural elements (e.g., circuits, interconnects, various voltages and signals, etc.) referred to by expressions with numeric/alphabetic characters at the end for distinction need not be distinguished from one another, expressions (reference numerals) without the numeric/alphabetic characters at the end will be used.

In general, according to one embodiment, an information processing apparatus includes: an interface circuit configured to receive first data items respectively relating to documents and a second data item relating to a question; and a processor configured to process the first data items and the second data item received by the interface circuit, wherein the processor is configured to: extract first named entities respectively from the first data items and extract a second named entity from the second data item; generate first vectors respectively relating to the first data items and the corresponding first named entities; generate a second vector relating to the second data item and the second named entity; calculate a similarity between each of the first vectors and the second vector; and acquire a third data item relating to an answer retrieved from the first data items based on a result of calculating the similarity.

(1) Embodiment

An information processing apparatus and an information processing method according to the embodiment will be described with reference to FIGS. 1 to 14. An information processing method according to the embodiment may include a method of controlling the information processing apparatus according to the embodiment.

(a) CONFIGURATION

A configuration and function of the information processing apparatus according to the embodiment will be described with reference to FIGS. 1 to 5.

FIG. 1 is a schematic block diagram showing a configuration example of an information processing apparatus 1 according to the present embodiment.

The information processing apparatus 1 according to the embodiment is capable of executing various information processes. The information processing apparatus 1 has an artificial intelligence (AI) function capable of executing, for example, natural language processing.

The information processing apparatus 1 is capable of executing various processes and tasks based on machine learning. The information processing apparatus 1 is configured, for example, to execute deep learning using supervised or unsupervised learning data.

The information processing apparatus 1 includes a processor 11, a memory 12, a storage 13, and a user interface 14.

The processor 11 performs a control process and a calculation process for execution of various processes and tasks of the information processing apparatus 1. The processor 11 is capable of controlling the memory 12, the storage 13, and the user interface 14. The processor 11 includes, for example, a processing unit 200 configured to execute various control processes, various calculation processes, various tasks, and the like.

The processor 11 includes a storage region 111 including a register, a cache, a read only memory (ROM), and the like.

The processor 11 includes an interface unit 119. The interface unit 119 is capable of receiving various data items from the memory 12, the storage 13, and the user interface 14. The interface unit 119 is capable of sending the received data items to the storage region 111 and/or the processing unit 200. The interface unit 119 is capable of, for example, sending a data item of a result of processing of the processor 11, such as a result of processing executed by the processing unit 200 to the memory 12, the storage 13, and the user interface 14. The interface unit 119 may include a plurality of devices, circuits, and the like for such processes.

The memory 12 temporarily stores various information items and various data items.

The memory 12 includes a random-access memory (RAM) 121 and a read-only memory (ROM) 122.

The RAM 121 includes a static RAM (SRAM), a dynamic RAM (DRAM), and the like. The RAM 121 temporarily stores various data items, software, and the like used in the information processing apparatus 1. The RAM 121 functions as a work memory and a buffer memory in the information processing apparatus 1. The RAM 121 can be accessed by the processor 11 for acquisition of data items.

The ROM 122 stores an operating system (OS), firmware, various software items, and various data items used in the information processing apparatus 1 in a substantially non-volatile manner. The ROM 122 may be accessed by the processor 11 for acquisition of data items.

Examples of the data items include user data to be processed, setting data used in various systems and devices, parameters used in various processes, and parts of software. Examples of the software include execution programs, firmware, applications, and an operating system (OS). The data items and/or software may correspond to information used in various systems and devices.

The storage 13 stores various information and various data items in a substantially non-volatile manner. The storage 13 includes a plurality of databases 131 and 132.

The storage 13 is, for example, a solid-state drive (SSD), a universal flash storage (UFS) device, or a hard disc drive (HDD). If the storage 13 is an SSD or a UFS device, the storage 13 includes a controller and a non-volatile semiconductor memory device. A non-volatile semiconductor memory device used in the SSD is a NAND-type flash memory. If the non-volatile semiconductor memory device is a NAND-type flash memory, the non-volatile semiconductor memory device communicates with the controller based on a Toggle DDR interface standard or an Open NAND Flash interface (ONFi) standard. The controller instructs various operations such as a read sequence, a write sequence, an erase sequence, and garbage collection to the non-volatile semiconductor memory device. The non-volatile semiconductor memory device executes various operations based on instructions from the controller.

In the information processing apparatus 1 according to the present embodiment, the storage 13 and the processor 11 may be provided in a single housing (not illustrated) or may be provided in different housings, as long as they are capable of communicating with each other either directly or indirectly. The processor 11 and the storage 13 may be installed in the same country or region, or may be installed in different countries or regions if they are capable of communicating with each other either directly or indirectly.

The user interface 14 may include a plurality of devices, circuits and the like for communications between the user of the information processing apparatus 1 and the processor 11. The user interface 14 includes an input device and an output device. The input device includes, for example, a touch panel, a keyboard, an operation button, and/or a microphone. The output device includes, for example, a display, a printer, and/or a speaker.

The user interface 14 supplies, via the input device, a request for execution of various processes and/or tasks from the user to the processor 11. The user interface 14 provides, via the output device, a result of execution of various processes and/or tasks to the user. The user interface 14 may provide an interim progress of execution of various processes and/or tasks to the user.

The user interface 14 may send various data items to the processor 11, the memory 12, and the storage 13. The user interface 14 is capable of receiving various data items from the processor 11, the memory 12, and the storage 13.

The information processing apparatus 1 may communicate with another device 9 via a wireless or wired network. For example, a request for execution of a process and/or a task may be supplied from the device 9 to the information processing apparatus 1. A result of execution of the process and/or the task may be supplied from the information processing apparatus 1 to the device 9. The device 9 is a computer device or a portable device. An example of the computer device is a personal computer or a server computer. An example of the portable device is a smartphone, a feature phone, or a tablet device.

The information processing apparatus 1 according to the present embodiment includes a processing unit 200, which is a system configured to execute document retrieval using deep learning. Hereinafter, the processing unit 200, which is a system of executing document retrieval using deep learning, will be referred to as a "retrieval system 200".

The retrieval system 200 may be, on the processor 11, realized by software, hardware, or a combination of software and hardware.

Thereby, in the information processing apparatus 1 according to the present embodiment, the processor 11 executes various processes and operations of a retrieval task for document retrieval. Hereinafter, a retrieval task is also referred to as a "retrieval process".

FIG. 2 is a schematic block diagram for illustrating the retrieval system 200 in the information processing apparatus 1 according to the present embodiment.

As shown in FIG. 2, in the information processing apparatus 1 according to the present embodiment, the retrieval system 200 executes a retrieval task of documents based on deep learning. Through the retrieval task, the retrieval system 200 selects and presents, from among a plurality of documents Dc stored in a database 131, which functions as a knowledge source, one or more documents Dc as an answer to a question Qs.

The question Qs is a data item including one or more sentences in a natural language. The question Qs is also referred to as a "question data item". The question Qs is, for example, supplied to the retrieval system 200 from outside (e.g., the user) of the information processing apparatus 1 via the user interface 14.

Each of the documents Dc stored in the database 131 is a data item including one or more natural-language sentences. The documents Dc are also referred to as "document data items". The documents Dc are, for example, supplied to the database 131 of the storage 13 from outside the information processing apparatus 1 via the user interface 14.

In the present embodiment, the natural language used in the information processing apparatus 1 and the retrieval system 200 is a natural language selected from among a plurality of natural languages, such as Japanese, English, Chinese, German, French, Russian, Spanish, and Italian. It is preferable that the natural language used in the question Qs be the same as the natural language used in the documents Dc. However, the natural language used in the question Qs may be different from the natural language used in the documents Dc.

The retrieval system 200 in FIG. 2 includes an extraction module 210, encoders 220 and 221 (221-1 to 221-_n_), a similarity calculation unit 230, a decision unit 240, a result output unit 250, and the like. The constituent elements 210, 220, 221, 230, 240, and 250 of the retrieval system 200 may be controlled by, for example, the processor 11.

The retrieval system 200 receives a question Qs and a plurality of documents Dc.

The question Qs is supplied, via the user interface 14, from a user to the retrieval system 200. The question Qs is stored into the storage region 111 of the processor 11 or the memory 12. The question Qs may be supplied from another device 9 to the retrieval system 200 via a network (not illustrated).

The question Qs includes a sentence inquiring about a certain matter, such as a person, an organization, a region, an event, an article, and a date and time. The question Qs is written in a natural language.

The documents Dc are supplied from the database 131 of the storage 13 to the retrieval system 200. Each document Dc includes a sentence indicating information relating to a certain matter, such as a person, a region, an event, or an article. Each document Dc is written in a natural language. Each document Dc includes one or more sentences. Each document Dc is configured of a plurality of words. For example, each document Dc is configured of tens to hundreds of words. The documents Dc are also referred to as "texts" or "passages".

The database 131 is a set of documents. The database 131 functions as a knowledge source and an information source for a retrieval task in the retrieval system 200.

The extraction module 210 receives the question Qs and the documents Dc supplied to the retrieval system 200. The extraction module 210 is capable of extracting various types of information from the question Qs and the documents Dc.

In the present embodiment, the extraction module 210 is configured to extract one or more named entities qNE included in a question Qs. In the present embodiment, the extraction module 210 is configured to extract one or more named entities dNE included in a document Dc.

Each of the named entities qNE and dNE is, for example, the name of a person, the name of an organization, the name of a place, the name of an event, the name of an article, and/or the date and time.

The extraction module 210 is also referred to as an "extraction unit" or a "named entity extraction module".

The extraction module 210 includes, for example, a mechanism configured of a neural network based on a model relating to a natural language.

Details of the configuration and function of the extraction module 210 will be described later.

The encoders 220 and 221 generate vectors QV and KV from the supplied natural-language data items Qs and Dc and the named entities qNE and dNE.

The encoder 220 generates, based on the sentence of the question Qs and the named entities qNE extracted from the question Qs, a vector QV relating to the question Qs. Hereinafter, the vector QV obtained from the question Qs and the named entities qNE is referred to as a "query vector QV". The query vector QV may also be referred to as a "query".

The query vector QV is a data item of a feature amount vector relating to the natural-language question Qs and the named entities qNE included in the question Qs.

The encoder 221 generates, based on the sentence of a document Dc and named entities dNE extracted from the document Dc, a vector KV relating to the document Dc. Hereinafter, the vector KV obtained from the document Dc and the named entities dNE will be referred to as a "key vector KV". The key vector KV may also be referred to as a "key".

The key vector KV is a data item of a feature amount vector relating to a natural-language document Dc and named entities dNE included in the document Dc.

One or more key vectors KV are, for example, stored in the database 132 of the storage 13.

Each of the encoders 220 and 221 includes, for example, a mechanism configured of a neural network based on a model relating to a natural language.

This allows the encoder 220 to transform a natural-language question Qs and named entities qNE into a vector QV. The encoder 221 is configured to transform natural-language documents Dc and named entities dNE into vectors KV.

Details of the configurations and functions of the encoders 220 and 221 will be described later.

In the present embodiment, the key vectors KV are used as, for example, data items indicating features of the documents Dc. In the present embodiment, the query vector QV is used as, for example, a data item used for retrieval of the key vectors KV and the documents Dc.

The similarity calculation unit 230 calculates a similarity between a certain data item and another data item. In the present embodiment, the similarity calculation unit 230 calculates a similarity between a query vector QV and a key vector KV.

The similarity is calculated based on, for example, a cosine similarity between the two vectors QV and KV. The similarity may be calculated based on an inner product of the two vectors QV and KV, a distance between the two vectors QV and KV, or the like. The distance for calculating the similarity is obtained by using, for example, the Euclidean distance, the Manhattan distance, the Minkowski distance, or the like.

The decision unit 240 is configured to execute a decision regarding various processes executed by the processor 11. In the present embodiment, the decision unit 240 decides, based on a calculation result of the similarity calculation unit 230, whether or not a query vector QV and a key vector KV are similar.

The decision unit 240 decides that, if the value of the result of calculation of the similarity between the query vector QV and the key vector KV is equal to or greater than a threshold value, the query vector QV is similar to the key vector KV. The decision unit 240 decides, if the value of the result of the calculation of the similarity between the query vector QV and the key vector KV is less than the threshold value, the query vector QV is not similar to the key vector KV. Hereinafter, the value of the result of the calculation of the similarity is also referred to as a "score".

If a plurality of threshold values are set to evaluate the similarity between the two vectors QV and KV, the similarity between the two vectors QV and KV may be evaluated in a stepwise manner. As a result, a plurality of documents Dc that can be answers may be classified into a plurality of levels according to the similarity score.

The result output unit 250 outputs, as a retrieval result RR in response to a question Qs in a retrieval task, one or more documents Dc<i> respectively corresponding to one or more key vectors KV<i> having a similarity equal to or greater than a certain score, based on a result of the processing of the decision unit 240. Here, i is an integer equal to or greater than one.

The result output unit 250 reads, for example, documents Dc corresponding to the respective key vectors KV from the storage 13 including the database 131. The result output unit 250 shows the read documents Dc to the user via the user interface 14.

The result output unit 250 detects, upon reading the documents Dc in the database 131, documents Dc corresponding to the key vectors KV of the retrieval result based on the table TBL.

The table TBL includes information relating to correspondence relationships among the key vectors KV and the documents Dc. The table TBL is, for example, generated by the table management unit 290. The table TBL is stored in the table management unit 290.

The table management unit 290 is capable of generating the table TBL based on the information relating to each document Dc provided by the extraction module 210 and the information relating to the key vector KV provided by the encoder 221.

The table TBL is also referred to as, for example, a "management table TBL".

The table management unit 290 may be provided in, for example, the processor 11, the memory 12, or the storage 13.

In this manner, the retrieval system 200 retrieves, from the database 131, a document Dc having a high similarity to the question Qs.

The retrieval system 200 shows the retrieval result RR of the retrieval task to the user. As a result, the retrieval result RR is provided to the user as an answer to the question Qs.

The question Qs may be supplied from another device 9 to the information processing apparatus 1 via a network. The retrieval result RR in response to the question Qs may be supplied to another device 9 from the information processing apparatus 1 via a network.

The extraction module 210 and the encoders 220 and 221 are provided to the processor 11 as software or firmware. The extraction module 210 and the encoder 220 are stored in the storage region 111 of the processor 11 as, for example, a computer program formed by a programming language such as Python.

The software of the extraction module 210 and the encoders 220 and 221 may be stored in the memory 12, or may be stored in the storage 13. In this case, upon execution of a process using the extraction module 210 and the encoders 220 and 221 to be described below, the software is read from the memory 12 into the storage region 111 of the processor 11, or from the storage 13 into the storage region 111 of the processor 11.

The software of the extraction module 210 and the encoders 220 and 221 may be stored into the RAM 131 upon execution of the process to be described below using the extraction module 210 and the encoders 220 and 221, and executed on the RAM 131 by the processor 11.

The extraction module 210 and the encoders 220 and 221 may be provided inside or outside the processor 11 as hardware.

<Extraction Module 210>

FIG. 3 is a block diagram for illustrating a configuration and function of the extraction module 210 of the retrieval system 200 in the information processing apparatus 1 according to the present embodiment.

The extraction module 210 includes a question receiver 211, a plurality of document receivers 212 (212-1 to 212-n), named entity extractors 213 and 214 (214-1 to 214-n), identification number extractors 219 (219-1 to 219-n), and the like. Here, n is an integer equal to or greater than one.

The question receiver 211 receives a question Qs supplied to the retrieval system 200.

Each of the document receivers 212-1 to 212-n receives a document Dc supplied from the database 131.

The document Dc includes, for example, an identification number Id. The identification number Id is information appended to the document Dc. The data items each including an identification number Id and a document Dc are also referred to as "document files FL (FL<1> to FL<n>)".

The identification number Id is a data item indicating the number for managing and identifying each of the documents Dc in the database 131. Each identification number Id is assigned to a corresponding one of the documents Dc. The identification number Id has a unique value for each document Dc. The identification number Id may be a file name of the document file FL, or may be a value included in the metadata of the document file FL. The identification number Id may be a value incorporated into the document Dc.

Each of the named entity extractors 213 and 214 includes a neural network based on a named entity recognition model M1.

The named entity extractors 213 and 214 respectively extract named entities qNE and dNE based on the named entity recognition model M1. The named entity recognition model M1 is a neural network model relating to a natural language constructed to enable determination as to whether or not a term in a sentence written in a natural language is a named entity.

The named entity extractor 213 receives the question Qs from the question receiver 211 based on the named entity recognition model M1.

The named entity extractor 213 extracts a single named entity qNE from a sentence configuring the question Qs based on the named entity recognition model M1.

The named entity extractor 213 tokenizes, for example, the sentence configuring the question Qs. Thereby, the question Qs is divided into a plurality of tokens.

The named entity extractor 213 determines, based on the named entity recognition model M1, whether or not each token is a named entity in view of the positions of the tokens, the parts of speech of the tokens, the relationship among the tokens, and the like, in the question Qs.

As a result, the token determined as a named entity is extracted from the question Qs as a named entity qNE in the question Qs.

The named entity extractor 213 sends the named entity qNE extracted from the question Qs to the encoder 220.

Each of the named entity extractors 214-1 to 214-$n$ receives a document Dc from a corresponding one of the document receivers 212-1 to 212-$n$.

Each named entity extractor 214 extracts, from one or more sentences configuring the document Dc, one or more named entities dNE (dNE<1>–1, dNE<1>–j, . . . , dNE<n>–1, dNE<n>–k). Here, j and k are integers equal to or greater than one.

Each named entity extractor 214 tokenizes, for example, the sentences included in the document Dc. Thereby, the document Dc is divided into a plurality of tokens.

The named entity extractor 214 determines, based on the named entity recognition model M1, whether or not each token is a named entity, in view of the positions of the tokens, the parts of speech of the tokens, and the relationship among the tokens, in the sentences of the document Dc.

As a result, one or more tokens determined as named entities are extracted from the document Dc as named entities dNE in the document Dc.

Each named entity extractor 214 sends the named entities dNE extracted from the document Dc to a corresponding one of the encoders 221.

Each of the identification number extractors 219-1 to 219-$n$ receives, from a corresponding one of the document receivers 212-1 to 212-$n$, a document Dc (document file FL) to which an identification number Id is appended.

Each of the identification number extractors 219-1, 219-2, . . . , and 219-$n$ extracts the identification number Id. The identification number extractor 219 sends the extracted identification number Id to the table management unit 290. The extracted identification number Id is linked with a corresponding document Dc and one or more key vectors KV generated from the corresponding document Dc.

The document receiver 212 may extract the identification number Id by, for example, segmenting the identification number Id from the document Dc.

There may be a case where the document Dc does not include a corresponding identification number Id. In this case, the identification number extractor 219 may generate an identification number Id corresponding to the document Dc.

The question receiver 211 sends the question Qs not only to the named entity extractor 213 but also to the encoder 220. The encoder 220 receives the question Qs separately from the named entity qNE.

Each document receiver 212 sends the document Dc not only to the corresponding named entity extractor 214 but also to a corresponding one of the encoders 221. The encoder 221 receives the document Dc separately from the named entity dNE.

In this manner, the extraction module 210 extracts the named entities qNE and dNE from the sentences of the question Qs and the documents Dc, respectively.

The extraction module 210 sends the extracted named entity qNE to the encoder 220 provided at a later stage, together with the question Qs.

The extraction module 210 sends the extracted named entities dNE to the encoder 221 provided at a later stage, together with the document Dc.

<Encoders 220 and 221>

FIG. 4 is a diagram for illustrating the configurations and functions of the encoders 220 and 221 of the retrieval system 200 in the information processing apparatus 1 according to the present embodiment.

Each of the encoders 220 and 221 includes a neural network configured to perform various calculation processes relating to deep learning of a natural language.

(a) of FIG. 4 is a diagram for illustrating the encoder 220 for a question Qs in the present embodiment.

The encoder 220 performs a vector transformation process of a supplied natural language based on a neutral network of a trained language model M2. The trained language model M2 is a neutral network model already subjected to machine learning (deep learning) relating to a natural language process using various data sets.

The encoder 220 includes a plurality of layers LY1$a$ and LY2$a$, corresponding to the configuration of the neural network. The layer LY1$a$ is, for example, an embedding layer. The layer LY2$a$ may be a hidden layer. The layer LY1$a$ may be an attention layer. The layer LY2$a$ may also be a feedforward layer.

The encoder 220 receives a question Qs and a named entity qNE extracted by the extraction module 210.

The encoder 220 divides a sentence of the question Qs into a plurality of tokens Tk.

The encoder 220 performs, depending on the functions of the layers LY1$a$ and LY2$a$, various processes on the named entity qNE and the tokenized question Qs.

The layer LY1$a$ including an embedding layer performs, for example, various processes on the tokenized question Qs and the named entity qNE for embedding of each token.

The layer LY2$a$ including a hidden layer performs various calculation processes, such as a multiply-add operation, in response to an output from the layer LY1$a$.

Through the various processes by the layers LY1$a$ and LY2$a$, the encoder 220 generates and outputs a query vector QV based on the question Qs and the named entity qNE. The query vector QV includes a plurality of components Cm. Each component Cm may be indicated by a p×q determinant.

Here, p and q are integers equal to or greater than one. In the present embodiment, each component Cm is a p×q array of numerical values, which is schematically illustrated in a hatched rectangular pattern for simplification.

(b) and (c) of FIG. 4 are diagrams for illustrating the encoder 221 for a document Dc in the present embodiment.

As shown in (b) of FIG. 4, the encoder 221 has substantially the same configuration and function as the encoder 220.

The encoder 221 performs a vector transformation process of a supplied natural language based on a neutral network of a trained language model M2.

The encoder 221 includes a plurality of layers LY1$b$ and LY2$b$.

The encoder 221 receives a document Dc and a named entity dNEa, from among named entities dNEa and dNEb extracted from the document Dc by the extraction module 210.

The encoder 221 divides one or more sentences of the document Dc into a plurality of tokens Tk.

The encoder 221 performs, depending on the functions of the layers LY1$b$ and LY2$b$, various processes on the named entity dNEa and the tokenized document Dc.

Through the various processes by the layers LY1$b$ and LY2$b$, the encoder 221 generates and outputs a key vector KVa based on the document Dc and the named entity dNEa.

The key vector KVa includes p×q components Cm. The number of components Cm of the key vector KVa is the same as the number of components Cm of the query vector QV.

As described above, one of a plurality of named entities dNE (dNEa and dNEb) extracted from a single document Dc is supplied to one of the encoders 221.

The encoder 221 generates, for each named entity dNE, a key vector KV relating to the document Dc and the named entity dNE.

As shown in (c) of FIG. 4, a named entity dNEb extracted from the document Dc and different from the named entity dNEa is supplied to another encoder 221, together with the document Dc.

The encoder 221 generates and outputs a key vector KVb based on the document Dc and the named entity dNEb.

The number of components Cm of the key vector KVb is the same as the number of components Cm of the key vector KVa. The components Cm of the key vector KVb differ from the components Cm of the key vector KVa.

If a single document Dc includes two named entities dNEa and dNEb, as shown in (b) and (c) of FIG. 4, two key vectors KVa and KVb are generated for each of the named entities dNEa and dNEb.

The key vectors KV are stored into the database 132 of the storage 13.

The generated key vectors KV form a latent representation space LS. The latent representation space LS is a set of vectors generated based on a neural network of a common model, such as the trained language model M2. The latent representation space LS is also referred to as a "latent space LS".

The query vector QV generated from the question Qs and the named entity qNE in the present embodiment are, in other words, vectors generated by reflecting, in the named entity qNE, the context of the question Qs including a certain named entity qNE.

The key vector KV generated from the document Dc and the named entity dNE in the present embodiment are, in other words, vectors generated by reflecting, in the named entity dNE, the context of the document Dc including a certain named entity dNE.

As described above, in the present embodiment, a plurality of vectors QV and KV used in the retrieval system 200 are formed.

In the above-described example, a configuration in which a single encoder 221 is provided for each document Dc is shown.

However, a plurality of documents Dc may correspond to a single encoder 221. In this case, the single encoder 221 sequentially generates a plurality of key vectors KV for each of a plurality of documents Dc that are sequentially supplied, using the documents Dc and the named entities dNE.

<Table TBL>

FIG. 5 is a diagram for illustrating a table TBL for the retrieval system 200 to manage documents Dc and key vectors KV in the information processing apparatus 1 according to the present embodiment.

The table management unit 290 receives, for example, information relating to a plurality of identification numbers Id of a plurality of documents Dc from the extraction module 210 and information relating to a plurality of key vectors KV from the encoders 221.

The table management unit 290 generates and stores a table TBL as shown in FIG. 5, based on the information relating to the identification numbers Id and the information relating to the key vectors KV.

FIG. 5 shows an example of the table TBL in the information processing apparatus 1 according to the present embodiment.

As shown in FIG. 5, based on a document Dc (Dc<1>, Dc<2>, Dc<3>, . . . , Dc<n−1>, and Dc<n>) and identification number Id (Id<1>, Id<2>, Id<3>, . . . , Id<n−1>, and Id<n>) of the document Dc, one or more key vectors KV (KV<1>, KV<2>, KV<3>, . . . , KV<n−1>, and KV<n>) generated from the document Dc are associated with the corresponding identification number Id of the document Dc.

As described above, the identification numbers Id<1>, Id<2>, Id<3>, . . . , Id<n−1>, and Id<n> are respectively associated with the documents Dc<1>, Dc<2>, Dc<3>, . . . , Dc<n−1>, and Dc<n>.

In the table TBL of FIG. 5, one or more key vectors KV generated from a single document Dc are associated with a single identification number Id.

Two key vectors KV<1>−1 and KV<1>−2, for example, are associated with the identification number Id <1>. Two key vectors KV<2>−1 and KV<2>−2, for example, are associated with the identification number Id <2>. Furthermore, m key vectors KV<3>−1, KV<3>−2, . . . , and KV<3>−m, for example, are associated with the identification number Id <3>. Here, m is an integer equal to or greater than one.

A single key vector KV<n−1>, for example, is associated with the identification number Id <n−1>. Two key vectors KV<n>−1 and KV<n>−2, for example, are associated with the identification number Id <n>.

Thus, based on the table TBL stored in the table management unit 290, a corresponding identification number Id can be detected from a single selected key vector KV.

Accordingly, even if a plurality of key vectors KV are generated from each document Dc, a corresponding document Dc can be read from the database 131 based on the identification number Id associated with each key vector KV.

In this manner, in the present embodiment, the retrieval system 200 is configured to acquire a particular document Dc corresponding to a key vector KV by referring to the table TBL.

By executing retrieval and acquisition of a document Dc based on a key vector KV using an identification number Id as in the present embodiment, the configuration of the retrieval system 200 can be simplified. In the present embodiment, the retrieval system 200 does not include, for example, a decoder for transforming key vectors KV into sentences.

As described above, the retrieval system 200 in the information processing apparatus 1 according to the present embodiment has the above-described configuration and function.

In the present embodiment, the generated query vector QV has a value obtained by reflecting, in a feature amount vector of the context of a sentence of a question Qs, a feature amount vector of a named entity qNE included in the question Qs.

Similarly, each of the generated key vectors KVa and KVb has a value obtained by reflecting, in a feature amount vector of the context of a sentence of a document Dc, a feature amount vector of each of named entities dNEa and dNEb included in the document Dc.

Each of two key vectors KVa and KVb in which features of the named entities dNEa and dNEb that differ from one another are respectively reflected may include a component Cm that differs for each of the named entities dNEa and dNEb, even if they are feature amount vectors based on a single document Dc.

In the present embodiment, even if the context of a document Dc relates to the context of a question Qs, for example, if a named entity dNE included in the document Dc is not similar to a named entity qNE included in the question Qs, a key vector KV in which the features of the named entity dNE are reflected may have a low similarity to a query vector QV. As a result, the document Dc including the named entity dNE having a low similarity to the named entity qNE of the question Qs is excluded from the answer to the question Qs.

On the other hand, if the context of the document Dc relates to the context of the question Qs and if the named entity dNE included in the document Dc is similar to the named entity qNE included in the question Qs, the key vector KV in which the features of the named entity dNE are reflected has a high similarity to the query vector QV. As a result, the document Dc including the named entity dNE with a high similarity to the named entity qNE of the question Qs is selected as an answer.

Also, with the information processing apparatus 1 according to the present embodiment, a plurality of key vectors KV, corresponding to the number of named entities dNE included in a single document Dc, may be generated from a single document Dc.

Thereby, compared to when a single key vector KV is generated from a single document Dc, the number of key vectors KV present in a single latent representation space LS increases according to the number of named entities dNE included in a single document.

As a result, with the information processing apparatus 1 according to the present embodiment, it is possible to improve the accuracy of retrieval in response to a retrieval query in the retrieval system 200.

Thus, the information processing apparatus 1 according to the present embodiment is capable of improving the reliability of the task.

(b) INFORMATION PROCESSING METHOD

An information processing method by the information processing apparatus 1 according to the present embodiment will be described with reference to FIGS. 6 to 14.

The information processing method according to the embodiment may include a method of controlling the information processing apparatus according to the embodiment.

<Generation of Key Vector KV>

A process of generating a key vector KV by the retrieval system 200 in the information processing apparatus 1 according to the present embodiment will be described with reference to FIGS. 6 to 8.

FIG. 6 is a flowchart showing a process of generating a key vector KV in the information processing apparatus 1 according to the present embodiment. Each of FIGS. 7 and 8 is a schematic diagram for illustrating a process of generating a key vector KV in the present embodiment.

<S1>

As shown in FIGS. 6 and 7, in the retrieval system 200, the extraction module 210 receives a plurality of documents Dc from the database 131 of the storage 13 via the interface unit 119 of the processor 11. Each document Dc includes one or more sentences. The documents Dc may be provided from a device outside the information processing apparatus 1.

The extraction module 210 receives, as a document Dc<1>, for example, the sentence "Biden was born in Scranton." The extraction module 210 receives, as a document Dc<2>, the sentence "Obama was born in Hawaii."

The extraction module 210 receives, as a document Dc<n>, the sentence "Obama was awarded the Nobel peace prize."

<S2>

The extraction module 210 receives, together with the documents Dc, identification numbers Id respectively associated with the documents Dc. The extraction module 210 extracts the identification numbers Id. The extraction module 210 segments, for example, the identification numbers Id from the documents Dc. The extracted identification numbers Id are sent to the table management unit 290.

<S3>

The extraction module 210 extracts one or more named entities dNE included in each document Dc based on a named entity recognition model M1.

In the example of FIG. 7, the extraction module 210 extracts, from the document Dc<1>, a named entity dNEa "Biden" and a named entity dNEb "Scranton". The extraction module 210 extracts, from the document Dc<2>, a named entity dNEc "Obama" and a named entity dNEd "Hawaii". The extraction module 210 extracts, from the document Dc<n>, a named entity dNEe "Obama" and a named entity dNEf "Nobel peace prize".

The extraction module 210 sends the extracted named entities dNE to a corresponding encoder 221. Also, the extraction module 210 sends the document Dc itself to the corresponding encoder 221, together with the named entities dNE extracted from the document Dc.

<S4>

The encoders 221 generate one or more key vectors KV based on a trained language model M2.

As shown in FIG. 8, each encoder 221 receives the documents Dc and the extracted one or more named entities dNE.

Each encoder 221 tokenizes the received documents Dc. Each encoder 221 performs a process of embedding the tokens and the named entities dNE. Thereby, the terms and the named entities dNE configuring the documents Dc are vectorized.

Based on the trained language model M2, each encoder 221 calculates, for each named entity dNE extracted from a certain document Dc, a key vector KV relating to the document Dc and the named entity dNE.

Thereby, for each document Dc, one or more key vectors KV, corresponding to the number of the named entities dNE extracted from the document Dc, are generated.

Two key vectors KV<1>-a and KV<1>-b, for example, are generated for the document Dc<1>. The key vector KV<1>-a is generated by the named entity dNEa "Biden" and the document Dc<1>. The key vector KV<1>-b is generated by the named entity dNEb "Scranton" and the document Dc<1>.

Two key vectors KV<2>-c and KV<2>-d, for example, are generated for the document Dc<2>. The key vector KV<2>-c is generated by the named entity dNEc "Obama" and the document Dc<2>. The key vector KV<2>-d is generated by the named entity dNEd "Hawaii" and the document Dc<2>.

Two key vectors KV<n>-e and KV<n>-f, for example, are generated for the document Dc<n>. The key vector KV<n>-e is generated by the named entity dNEe "Obama" and the document Dc<n>. The key vector KV<n>-f is generated by the named entity dNEf "Nobel peace prize" and the document Dc<n>.

As a result, a latent representation space LS relating to the documents Dc stored as a knowledge source in the database 131 is generated. The latent representation space LS including the key vectors KV of the documents Dc is generated based on a neural network using an identical natural language model.

The number of the key vectors KV in the latent representation space LS is larger than the number of documents Dc stored in the database 131. However, the number of the key vectors KV may be smaller than the number of the documents Dc, depending on the number of the named entities dNE included in each document Dc.

<S5>

The retrieval system 200 causes the processor 11 to store, into the storage 13, the generated key vectors KV and identification numbers Id corresponding to the key vectors KV. Thereby, the latent representation space LS is stored into the storage 13. The key vectors KV and the identification numbers Id are, for example, stored into the table TBL so as to be associated with each other.

The table management unit 290 receives, for example, the key vectors KV and the identification numbers Id. The table management unit 290 generates a table TBL showing correspondence relationships among the key vectors KV and the identification numbers Id. It suffices that the table TBL is generated prior to execution of a retrieval task.

Upon execution of the retrieval task, for example, the generated key vectors KV are read into the memory 12. Upon execution of the retrieval task, the table TBL relating to the key vectors KV and the identification numbers Id is read into the table management unit 290. The key vectors KV may be read into the table management unit 290.

As described above, a plurality of key vectors KV are generated from a plurality of documents Dc.

Thereby, a latent representation space LS including the key vectors KV is generated.

<Retrieval Task>

A retrieval task by the retrieval system 200 in the information processing apparatus 1 according to the present embodiment will be described with reference to FIGS. 9 to 13.

FIG. 9 is a flowchart showing a retrieval task in the information processing apparatus 1 according to the present embodiment. Each of FIGS. 10 to 13 is a schematic diagram for illustrating a retrieval task in the present embodiment.

<S10>

As shown in FIG. 9, the retrieval system 200 receives a question Qs to be a target for a retrieval task. The question Qs is generated by the user of the information processing apparatus 1 or the device 9. The user supplies the question Qs to the information processing apparatus 1 via the user interface 14. The question Qs is input to the retrieval system 200 via the interface unit 119 of the processor 11. The question Qs includes one or more sentences.

As shown in FIG. 10, the extraction module 210 receives the question Qs in the retrieval system 200.

In the present embodiment, for example, the extraction module 210 receives, as the question Qs, the sentence "Where was Obama born?".

<S11>

The extraction module 210 extracts a named entity qNE from the question Qs based on the named entity extraction model M1.

In the example of FIG. 10, the extraction module 210 extracts the named entity qNE "Obama" from the question Qs.

The extraction module 210 sends the extracted named entity qNE to the encoder 220. The extraction module 210 sends the question Qs itself to the encoder 220, together with the named entity qNE extracted from the question Qs.

<S12>

The encoder 220 receives the question Qs and the named entity qNE.

The encoder 220 calculates a query vector QV using the question Qs and the named entity qNE based on the trained language model M2.

Thereby, the query vector QV corresponding to the question Qs is generated. The generated query vector QV has a value obtained by reflecting, in a feature amount vector of the question Qs, a feature amount vector of the named entity qNE extracted from the question Qs.

<S13>

As shown in FIG. 11, the retrieval system 200 reads, under the control of the processor 11, the key vectors KV included in the latent representation space LS from the database 132 of the storage 13, in parallel with the reception of the question Qs and various processes regarding the question Qs. The read key vectors KV are, for example, stored into the memory 12.

The retrieval system 200 causes the processor 11 to read the table TBL relating to the identification numbers Id and the key vectors KV into the table management unit 290.

The key vectors KV and the table TBL may be read from the storage 13 prior to the reception of the question Qs.

<S14>

As shown in FIG. 12, the similarity calculation unit 230 calculates a similarity between the query vector QV and each key vector KV. The similarity between the query vector QV and each key vector KV is calculated based on, for example, a cosine similarity.

Thereby, a score SCR indicating a result of the calculation of the similarity between the query vector QV and each key vector KV is obtained for each key vector KV.

The similarity calculation unit 230 sends the score SCR to the decision unit 240.

<S15>

The decision unit 240 executes, based on the result of the similarity calculation, the decision process of a key vector KV that can be a candidate answer.

As shown in FIG. 13, the decision unit 240 receives the similarity score SCR from the similarity calculation unit 230. The decision unit 240 retrieves a key vector KV similar to the query vector QV from among the key vectors KV included in the latent representation space LS.

The decision unit 240 decides, from among the key vectors KV, a key vector KV that can be a candidate answer to the question Qs based on the score SCR relating to each key vector KV.

The decision unit 240 assigns, for example, rankings of the key vectors KV with respect to the query vector QV according to whether or not the similarity score SCR satisfies a threshold value. Thereby, the decision unit 240 acquires, as candidate answers, one or more key vectors KV having a similarity equal to or greater than a certain threshold value.

In the example of FIG. 13, the decision unit 240 selects and acquires key vectors KV<2>–c and KV<n>–e in which the features of the named entity dNE "Obama" are reflected, together with the features of the context of the document Dc itself.

<S16>

As shown in FIG. 13, based on a result of the decision process, the result output unit 250 acquires and outputs one or more documents Dc, as a retrieval result RR in response to the question Qs.

The result output unit 250 receives, from the decision unit 240, the key vectors KV acquired as a result of the similarity-based decision process.

Based on the received key vectors KV, the result output unit 250 refers to the table TBL of the table management unit 290. Based on the result of reference to the table TBL, the result output unit 250 detects identification numbers Id corresponding to the key vectors KV acquired as the candidate answers.

The result output unit 250 accesses the database 131 of the storage 13. The result output unit 250 reads, from the database 131, one or more documents Dc corresponding to the detected identification numbers Id.

If, for example, the key vector KV<2>–c is selected, the result output unit 250 detects, based on the selected key vector KV<2>–c and the table TBL, that the identification number Id<2> is associated with the key vector KV<2>–c.

Thereby, the result output unit 250 reads, from the database 131, the document Dc<2> corresponding to the detected identification number Id<2>.

If the key vector KV<n>–e is selected, the result output unit 250 detects, based on the selected key vector KV<n>–e and the table TBL, that the identification number Id<n> is associated with the key vector KV<n>–e.

Thereby, the result output unit 250 reads the document Dc<n> corresponding to the detected identification number Id<n> from the database 131.

In this manner, the result output unit 250 acquires documents Dc (Dc<2> and Dc<n>) corresponding to the key vectors KV selected as candidate answers.

The result output unit 250 outputs the acquired documents Dc<2> and Dc<n> to the user interface 14 as answer-related data items.

As a result, the user who has posed the question Qs recognizes the documents Dc as the retrieval result RR in response to the question Qs, based on the output from the result output unit 250.

Through the above-described processes, the retrieval task in the information processing apparatus 1 according to the present embodiment is completed.

(C) CONCLUSION

A document retrieval method using deep learning such as dense passage retrieval (DPR) may realize more high-accuracy retrieval of a data set used for additional learning (fine-tuning) required for functioning of the DPR, compared to a classic retrieval method such as a method of retrieval of a relevant document based on character string matching.

However, the accuracy of retrieval of an unseen question or document during the fine-tuning by the DPR-based document retrieval method tends to be low. In a retrieval task in response to a question relating to a named entity, for example, the retrieval properties of the DPR-based document retrieval method may be lower than the retrieval properties of a classic retrieval method.

As described above, in the information processing apparatus 1 according to the present embodiment, the retrieval system 200 extracts named entities qNE and dNE from a question Qs and a document Dc to be a target of retrieval, respectively.

The retrieval system 200 generates a query vector QV from the question Qs and the extracted named entity qNE. The retrieval system 200 generates, for each of the named entities dNE extracted from the document Dc, a plurality of key vectors KV from the document Dc and the named entities dNE.

Thereby, in the information processing apparatus 1 according to the present embodiment, key vectors KV of the number greater than the number of documents Dc may be present on an identical latent representation space LS. In the present embodiment, the level of redundancy of the key vectors KV with respect to a single document Dc becomes high.

In the present embodiment, the features of the named entity qNE extracted from the question Qs are further reflected, in addition to the features of the context of the question Qs, in the query vector QV corresponding to the question Qs. Similarly, the features of the named entity dNE extracted from the document Dc are further reflected, in addition to the features of the context of the document Dc, in the key vector KV corresponding to the document Dc.

This allows the information processing apparatus 1 according to the present embodiment to retrieve, from among a plurality of key vectors KV, a key vector KV in which features of a named entity dNE similar to the named entity qNE included in the question Qs are reflected.

As a result, the information processing apparatus 1 according to the present embodiment has improved retrieval properties for an unseen sentence.

FIG. 14 is a graph indicating characteristics relating to a retrieval task of the information processing apparatus 1 according to the present embodiment.

The lateral axis of the graph in FIG. 14 corresponds to the number of relevant key vectors to questions that may be acquired as a retrieval result. The vertical axis of the graph in FIG. 14 corresponds to the accuracy of retrieval (in units of %).

A characteristic A1 shown by the solid line with circular points shows a progression of the accuracy of retrieval in the retrieval system 200 in the information processing apparatus 1 according to the embodiment. A characteristic A2 shown by the dashed line with triangular points shows a progression of the accuracy of retrieval in a retrieval system of a comparative example. The retrieval system of the comparative example is a general, DPR-based retrieval system.

The characteristic of the retrieval system 200 of the present embodiment and the characteristic of the retrieval system of the comparative example were evaluated using the EntityQuestions dataset. The total number of questions in a test set is 22,075.

As shown in FIG. 14, if a key vector KV generated from an extracted named entity dNE and a document Dc are used for a retrieval task of the retrieval system 200 as in the present embodiment, the accuracy of retrieval of the retrieval system 200 according to the present embodiment becomes higher than the accuracy of retrieval of the retrieval system according to the comparative example.

In this manner, with the information processing apparatus 1 according to the present embodiment, it is possible to improve the accuracy of retrieval of a retrieval task.

As described above, with the information processing apparatus 1 and the information processing method according to the present embodiment, it is possible to improve the accuracy of a task.

(2) Modification

A modification of the information processing apparatus 1 according to the present embodiment will be described with reference to FIG. 15.

FIG. 15 is a schematic diagram for illustrating a modification of the information processing apparatus 1 according to the present embodiment.

As shown in FIG. 15, a question Qsx may include a plurality of named entities qNEa and qNEb. In the example of FIG. 15, for example, a question Qsx "Which Nobel prize was awarded to Obama?" is supplied to the retrieval system 200 in the information processing apparatus 1. The question Qs includes a named entity qNEa "Obama" and a named entity qNEb "Nobel prize".

In this case, similarly to the documents Dc and the key vectors KV, a plurality of query vectors QVa and QVb are calculated and generated for each of a plurality of named entities qNE included in the question Qsx.

The extraction module 210 extracts, based on a named entity extraction model M1, a plurality of named entities qNEa and qNEb from the question Qsx. Herein, two named entities qNEa "Obama" and qNEb "Nobel prize" are extracted.

The extraction module 210 sends the question Qsx and the two extracted named entities qNEa and qNEb to the encoder 220.

The encoder 220 calculates, based on a trained language model M2, query vectors QVa and Qvb, for each of the named entities qNEa and qNEb, using the question Qsx and the named entities qNEa and qNEb. Thereby, two query vectors QVa and QVb are generated from a single question Qsx.

Features of the named entity qNEa with respect to features of the context of the question Qsx are reflected in one of the query vectors QVa. Features of the named entity qNEb with respect to features of the context of the question Qsx are reflected in the other query vector QVb.

The similarity calculation unit 230 calculates similarities between the query vectors QVa and QVb and the key vectors KV.

The similarity calculation unit 230 calculates a similarity between the query vector QVa and each key vector KV. Thereby, a plurality of scores SCRa are obtained as a result of the similarity calculation relating to the query vector QVa and each key vector KV.

The similarity calculation unit 230 calculates a similarity between the query vector QVb and each key vector KV. Thereby, a plurality of scores SCRb are obtained as a result of the similarity calculation relating to the query vector QVb and each key vector KV.

The decision unit 240 decides, based on the similarity calculation result relating to each of the query vectors QVa and Qvb, a key vector KV that can be a candidate answer to the question Qsx from among a plurality of key vectors KV in the latent representation space LS.

The result output unit 250 retrieves, based on the decision result and the table TBL, a document Dc that can be an answer from the database 131. Thereby, the result output unit 250 acquires one or more documents Dc from the database 131.

The result output unit 250 outputs a document Dc of the retrieval result RR.

Even if the question Qsx from the user includes a plurality of named entities qNEa and qNEb as in the present modification, the retrieval system 200 according to the present embodiment is capable of acquiring a document Dc that can be an answer to the question Qsx using a plurality of query vectors QVa and QVb generated for each of the named entities qNEa and qNEb.

Accordingly, with the information processing apparatus 1 according to the present modification, it is possible to obtain substantially the same advantageous effects as those of the above-described embodiment.

(3) Others

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:

an interface circuit configured to receive first data items respectively relating to documents and a second data item relating to a question; and a processor configured to process the first data items and the second data item received by the interface circuit, the first data items being supplied from outside the information processing apparatus via the interface circuit, the second data item being supplied from a user via the interface circuit, wherein the processor is configured to:

extract first named entities respectively from the first data items and extract a second named entity from the second data item;

generate first vectors respectively relating to the first data items based on each of the first data items and the extracted first named entity corresponding to each of the first data items;

generate a second vector relating to the second data item based on the second data item and the extracted second named entity;

calculate a similarity between each of the first vectors and the second vector;

acquire a third data item relating to an answer retrieved from the first data items based on a result of calculating the similarity, and output the acquired third data item to outside of the information processing apparatus via the interface circuit so as to be available to the user, wherein the processor comprises:

a plurality of extractors configured to respectively extract the first named entities and the second named entity and each having a first neural network configured to extract a named entity based upon an entity recognition model trained to determine whether a natural language term is the named entity, the entity recognition model tokenizing one of documents into a plurality of tokens and determining whether each token is a first named entity based upon positions of the plurality of tokens, parts of speech of the plurality of tokens, and a relationship among the plurality of tokens in sentences of the one of the documents; and a plurality of encoders respectively arranged with the plurality of extractors, first ones of the encoders respectively arranged to receive one of the first data items and a corresponding one of the extracted first named entities and a second one of the encoders receiving the extracted second named entity and the second data item, each of the encoders having a second neural network configured to generate the first vector and the second vectors based upon a language model trained to generate a query vector as the first vector and key vectors as the second vectors.

2. The information processing apparatus according to claim 1, wherein the second neural network is a natural-language model.

3. The information processing apparatus according to claim 1, wherein the processor is further configured to extract k first named entities from one first data item of the first data items, and generate k first vectors based on the one first data item and the k first named entities, where k is an integer equal to or greater than two.

4. The information processing apparatus according to claim 1, wherein the processor is further configured to store correspondence relationships among identification numbers and the first vectors, and each of the identification numbers is assigned to a corresponding one of the first data items.

5. The information processing apparatus according to claim 1, wherein each of identification numbers is assigned to a corresponding one of the first data items, each of the identification numbers is associated with a corresponding one of the first vectors, and based on an identification number corresponding to a selected vector from the first vectors, a first data item corresponding to the selected vector is acquired from the first data items.

6. The information processing apparatus according to claim 1, further comprising:

a storage configured to store the first data items and the first vectors.

7. The information processing apparatus according to claim 1, further comprising:

a storage configured to store the generated first vectors, wherein the processor is further configured to read, in calculating the similarity, the first vectors from the storage.

8. An information processing method of an information processing apparatus including an interface circuit, the method comprising:

receiving first data items respectively relating to documents, the first data items being supplied from outside the information processing apparatus via the interface circuit;

extracting first named entities respectively from the first data items;

generating first vectors respectively relating to the first data items based on each of the first data items and the extracted first named entity corresponding to each of the first data items;

receiving a second data item relating to a question, the second data item being supplied from a user via the interface circuit;

extracting a second named entity from the second data item;

generating a second vector relating to the second data item based on the second data item and the extracted second named entity;

calculating a similarity between each of the first vectors and the second vector;

acquiring, based on a result of calculating the similarity, a third data item relating to an answer retrieved from the first data items;

outputting the acquired third data item to outside of the information processing apparatus via the interface circuit so as to be available to the user;

extracting the first and second named entities comprises extracting the first named entities and the second named entity and using respective first neural networks configured to extract a named entity based upon an entity recognition model trained to determine whether a natural language term is the named entity, the entity recognition model tokenizing one of documents into a plurality of tokens and determining whether each token is a first named entity based upon the positions of the plurality of tokens, parts of speech of the plurality of tokens, and a relationship among the plurality of tokens in sentences of the one of the documents; and generating the first and second vectors comprises respective first encodings of the first data items and a corresponding one of the extracted first named entities and a second encoding of the extracted second named entity and the second data item, each of the first and second encodings using a second neural network configured to generate the first vector and the second vectors based upon a language model trained to generate a query vector as the first vector and key vectors as the second vectors.

9. The information processing method according to claim 8, wherein the second neural network is a natural-language model.

10. The information processing method according to claim 8, further comprising:

extracting k first named entities from one first data item of the first data items, where k is an integer equal to or greater than two; and generating k first vectors based on the one first data item and the k first named entities.

11. The information processing method according to claim 8, further comprising:

storing correspondence relationships among identification numbers and the first vectors, wherein each of the identification numbers is assigned to a corresponding one of the first data items.

12. The information processing method according to claim 8, wherein each of identification numbers is assigned to a corresponding one of the first data items, each of the identification numbers is associated with a corresponding one of the first vectors, and the method further comprising:

acquiring, based on an identification number corresponding to a selected vector from the first vectors, a first data item corresponding to the selected vector from the first data items.

13. The information processing method according to claim 8, further comprising:

storing the first data items into a storage; and storing the first vectors into the storage.

14. The information processing method according to claim 8, further comprising:

storing the generated first vectors into a storage; and reading, in calculating the similarity, the first vectors from the storage.

* * * * *